(12) United States Patent
Ryu

(10) Patent No.: US 9,721,367 B2
(45) Date of Patent: *Aug. 1, 2017

(54) APPARATUS, METHOD AND MEDIUM FOR EDITING SYMBOL IMAGES

(71) Applicant: Jungha Ryu, Seongnam-si (KR)

(72) Inventor: Jungha Ryu, Seongnam-si (KR)

(*) Notice: Subject to any disclaimer, the term of this patent is extended or adjusted under 35 U.S.C. 154(b) by 49 days.

This patent is subject to a terminal disclaimer.

(21) Appl. No.: 14/795,870

(22) Filed: Jul. 9, 2015

(65) Prior Publication Data

US 2015/0317817 A1    Nov. 5, 2015

Related U.S. Application Data

(63) Continuation of application No. PCT/KR2014/000263, filed on Jan. 9, 2014.

(30) Foreign Application Priority Data

| Jan. 9, 2013 | (KR) | .......................... 10-2013-0002691 |
| Feb. 1, 2013 | (KR) | .......................... 10-2013-0011657 |
| Jul. 9, 2013 | (KR) | .......................... 10-2013-0080577 |

(51) Int. Cl.
*G06T 11/60* (2006.01)
*G06F 17/21* (2006.01)
(Continued)

(52) U.S. Cl.
CPC ............ *G06T 11/60* (2013.01); *G06F 17/214* (2013.01); *G06T 11/001* (2013.01); *G09B 19/00* (2013.01); *G09B 19/06* (2013.01)

(58) Field of Classification Search
CPC .......... G06K 9/00429; G06K 2209/011; G06F 17/2223; G06F 17/2217
(Continued)

(56) References Cited

U.S. PATENT DOCUMENTS

| 5,157,606 A | 10/1992 | Nagashima |
| 5,984,189 A * | 11/1999 | Tomioka ................. G06K 19/00 235/487 |

(Continued)

FOREIGN PATENT DOCUMENTS

| JP | 3055310 | 10/1998 |
| JP | 11-15589 | 1/1999 |

(Continued)

OTHER PUBLICATIONS

International Search Report and Written Opinion of May 1, 2014 for International Application No. PCT/KR2014/000263.

(Continued)

*Primary Examiner* — Kimberly A Williams
(74) *Attorney, Agent, or Firm* — Husch Blackwell LLP

(57) ABSTRACT

An apparatus and a method for editing symbol images can convert characters of various languages or numerals to symbol images, or can output the characters or numerals by analyzing the symbol images. The symbol images may symbolically represent the Korean characters, and at least one of symbolized objects may be arranged in a part of divided spaces by dividing the space so as to separate initial consonants, medial consonants, and final consonants of the character in the predetermined divided spaces for expressing at least one character.

27 Claims, 43 Drawing Sheets

(51) Int. Cl.
*G06T 11/00* (2006.01)
*G09B 19/00* (2006.01)
*G09B 19/06* (2006.01)

(58) Field of Classification Search
USPC ......... 345/171, 467–471; 382/189, 305, 309, 382/310; 715/264, 265
See application file for complete search history.

(56) References Cited

U.S. PATENT DOCUMENTS

| | | | | |
|---|---|---|---|---|
| 6,765,504 | B2* | 7/2004 | Ouyang | G06F 3/0233 341/23 |
| 8,508,795 | B2* | 8/2013 | Ohguro | G06F 17/211 345/625 |
| 2001/0045959 | A1* | 11/2001 | Hayama | B41J 3/4075 345/636 |
| 2003/0074185 | A1* | 4/2003 | Kang | G06F 17/2863 704/2 |
| 2006/0217955 | A1* | 9/2006 | Nagao | G06F 17/289 704/2 |
| 2009/0296124 | A1* | 12/2009 | Ohguro | G06F 17/241 358/1.9 |
| 2010/0182230 | A1* | 7/2010 | Yamada | G06F 17/2217 345/156 |
| 2011/0026081 | A1* | 2/2011 | Hamada | G06T 11/00 358/1.18 |
| 2015/0015587 | A1* | 1/2015 | Ryu | G06F 17/2217 345/469 |

FOREIGN PATENT DOCUMENTS

| | | |
|---|---|---|
| KR | 1990-0015019 | 10/1990 |
| KR | 1999-0080199 | 11/1999 |
| KR | 2000-0035061 | 6/2000 |
| WO | 2011/145117 A2 | 11/2011 |

OTHER PUBLICATIONS

Anonymous: "Braille translator—Wikipedia, the free encyclopedia", Dec. 18, 2012, XP05527701, Retrieved from the Internet: URL:https://en.wikipedia.org/w/index.php?title=Braille__translator&oldid=528709162.

* cited by examiner

*FIG.7A*     *FIG.7B*     *FIG.7C*
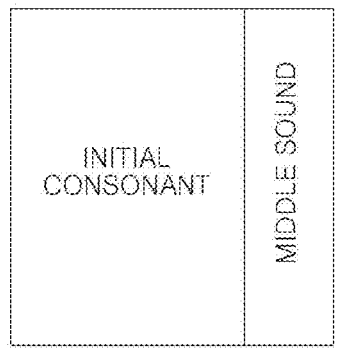 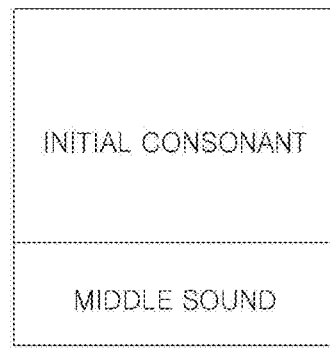 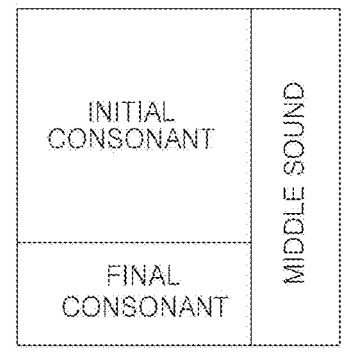
*FIG.7D*     *FIG.7E*     *FIG.7F*
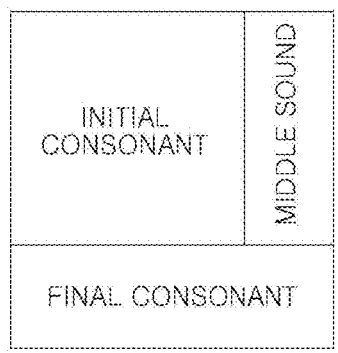  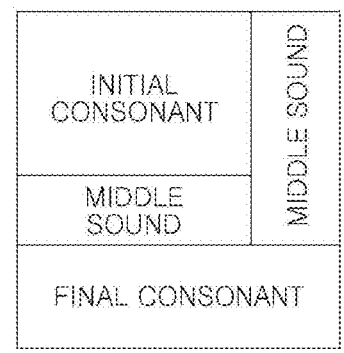

*FIG.10A*    *FIG.10B*    *FIG.10C*    *FIG.10D*
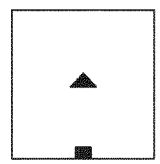 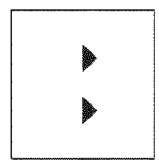 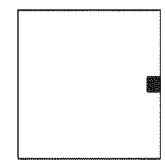 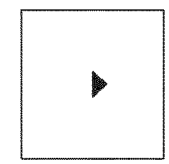
*FIG.10E*    *FIG.10F*    *FIG.10G*    *FIG.10H*
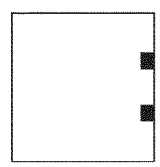 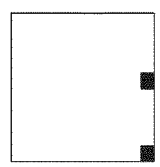 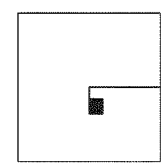 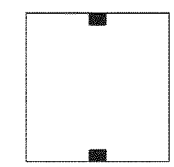
*FIG.10I*    *FIG.10J*    *FIG.10K*    *FIG.10L*
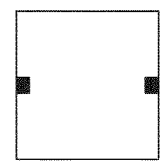 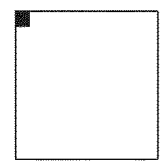 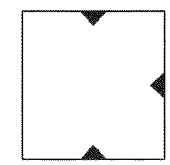 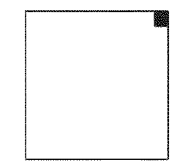
*FIG.10M*    *FIG.10N*    *FIG.10O*    *FIG.10P*
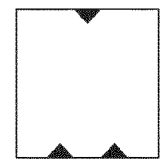 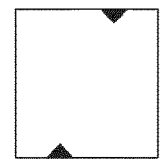 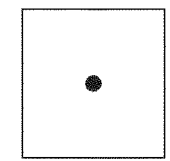 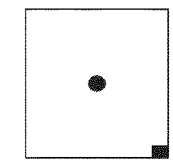

FIG.11Q  FIG.11R  FIG.11S  FIG.11T
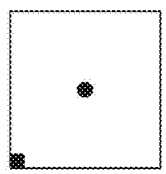 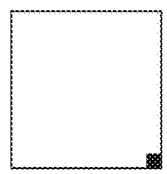 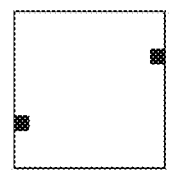 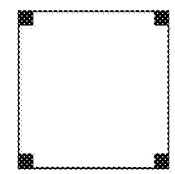
FIG.11U  FIG.11V  FIG.11W  FIG.11X
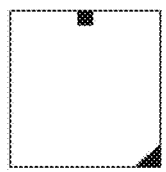 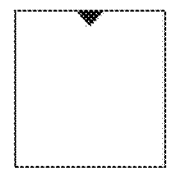 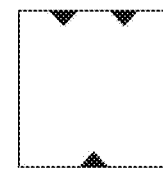 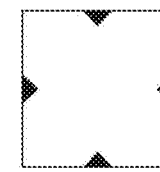
FIG.11Y  FIG.11Z
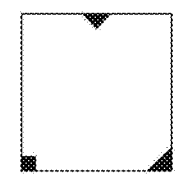 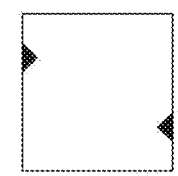

*FIG.12A*  *FIG.12B*
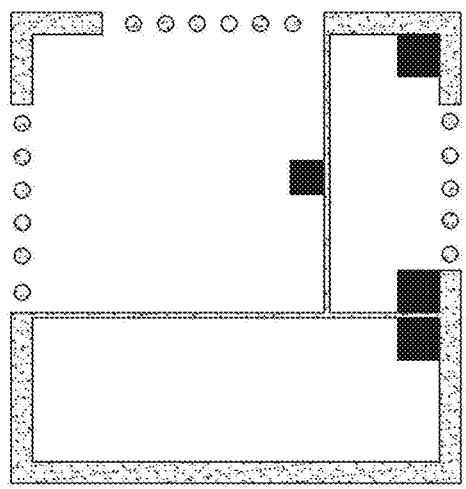 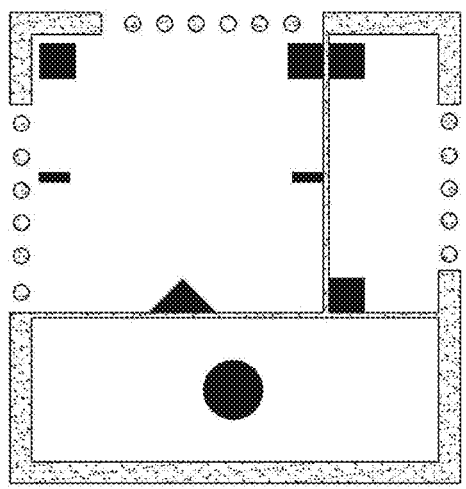
*FIG.13*
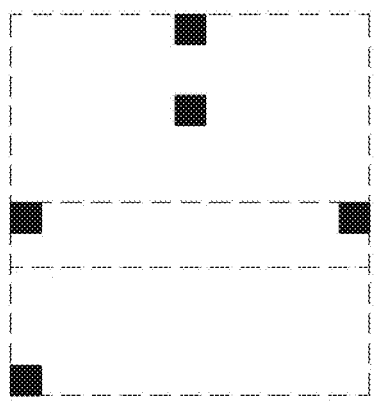

*FIG.18A*  *FIG.18B*  *FIG.18C*
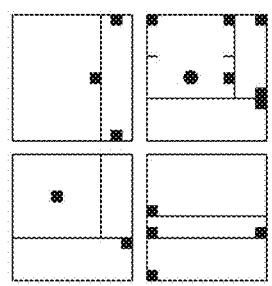  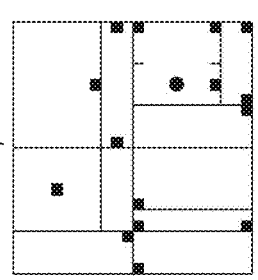  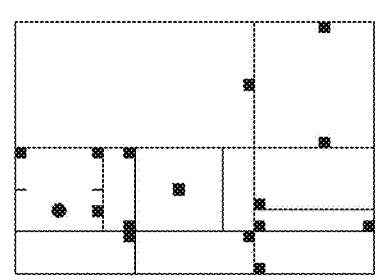
*FIG.18D*
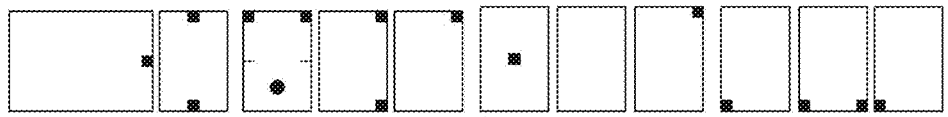

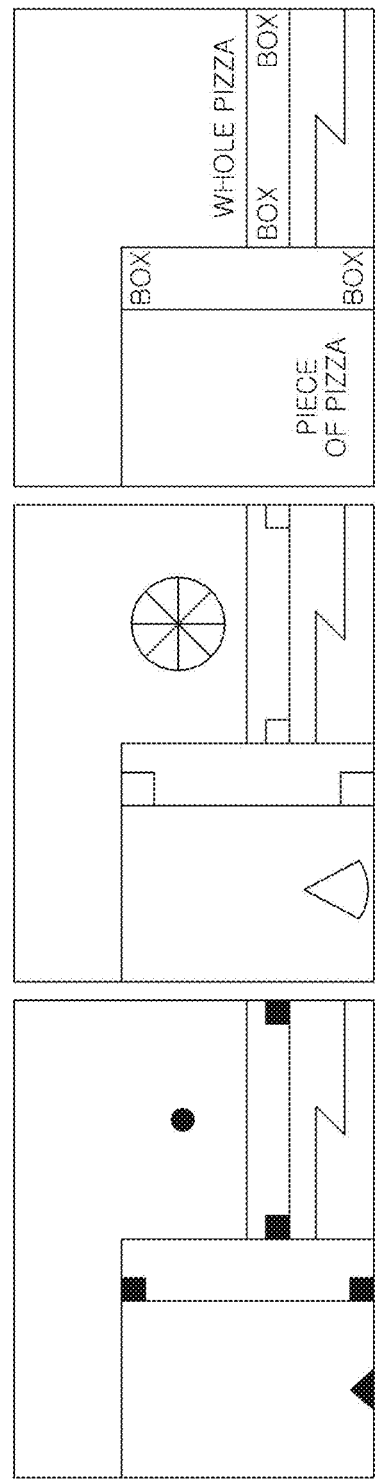

*FIG.27A*   *FIG.27B*
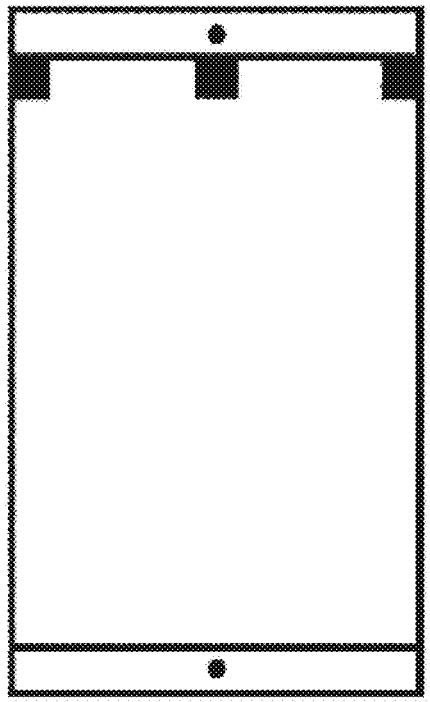

FIG.31A
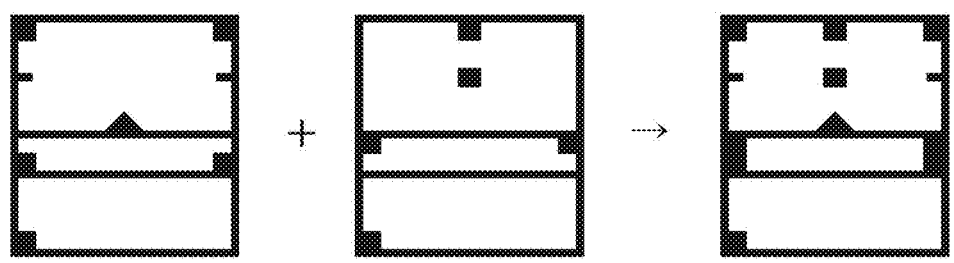
FIG.31B  FIG.31C  FIG.31D
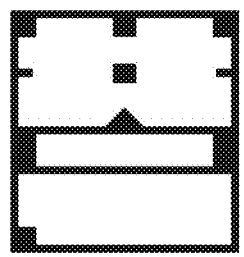 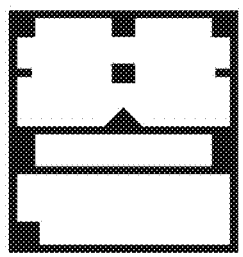 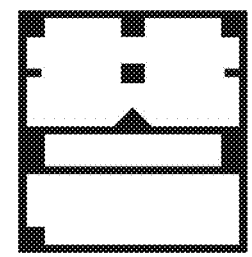

FIG.34A  FIG.34B  FIG.34C  FIG.34D
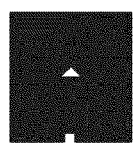 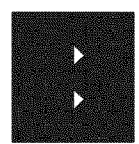 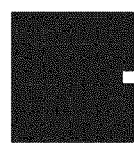 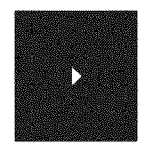
FIG.34E  FIG.34F  FIG.34G  FIG.34H
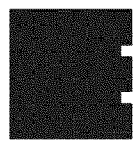 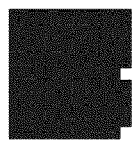 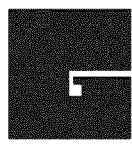 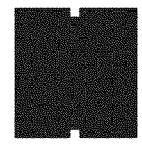
FIG.34I  FIG.34J  FIG.34K  FIG.34L
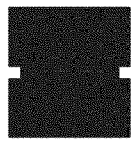 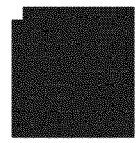 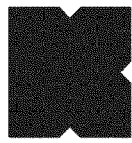 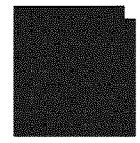
FIG.34M  FIG.34N  FIG.34O  FIG.34P
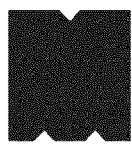 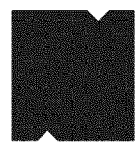 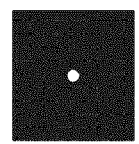 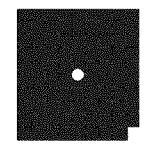

FIG.34Q    FIG.34R    FIG.34S    FIG.34T
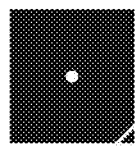 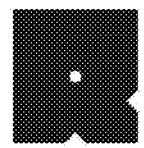 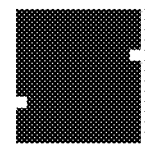 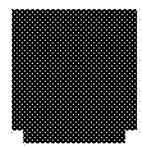
FIG.34U    FIG.34V    FIG.34W    FIG.34X
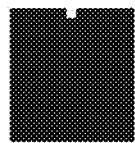 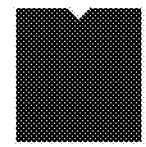 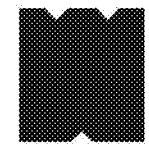 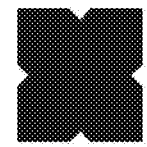
FIG.34Y    FIG.34Z
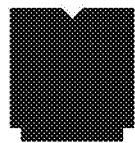 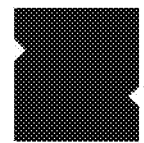

*FIG.35Q*   *FIG.35R*   *FIG.35S*   *FIG.35T*
*FIG.35U*   *FIG.35V*   *FIG.35W*   *FIG.35X*
*FIG.35Y*   *FIG.35Z*

FIG.41
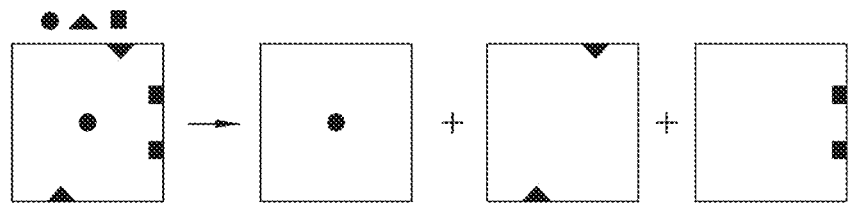
FIG.42A    FIG.42B    FIG.42C
    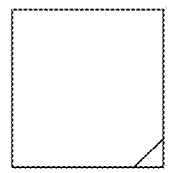    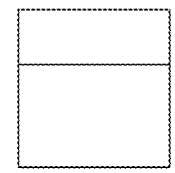
FIG.43A    FIG.43B    FIG.43C
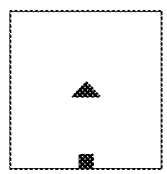 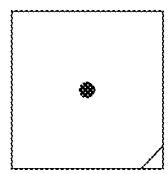 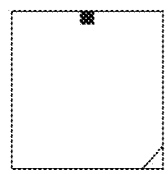 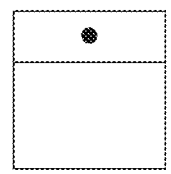 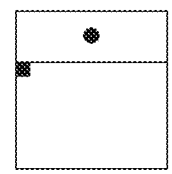

APPARATUS, METHOD AND MEDIUM FOR EDITING SYMBOL IMAGES

CROSS REFERENCES TO RELATED APPLICATIONS

This application is a continuation of International Patent Application No. PCT/KR2014/000263, filed on Jan. 9, 2014, which claims the priority to Korean Patent Application Nos. 10-2013-0002691 filed on Jan. 9, 2013, 10-2013-0011657 filed on Feb. 1, 2013, and 10-2013-0080577 filed on Jul. 9, 2013, which are hereby incorporated by reference in their entireties into this application.

TECHNICAL FIELD

Some embodiments of the present disclosure may relate to a symbol image editing apparatus and method, and a recording medium having a program recorded thereon for executing the apparatus and method, for example, but not limited to, a symbol image editing apparatus and method for printing out a character (including numeral) of a language (the Korean alphabet, English, etc.) to a symbol image, or for printing out an analyzed symbol image against a character of the corresponding language, and a machine readable recording medium having a program recorded thereon for executing the apparatus and method.

In addition, some exemplary embodiments of the present disclosure may relate to a method and apparatus for editing a symbol image and a recording medium having a program recorded thereon for executing the method and apparatus, which are adapted to not only facilitate design development in various products, art work, buildings, craftwork, city planning in which characters such as the Korean alphabet, English alphabet, various foreign languages, numerals and/or any symbols are symbolized, but also to promote the development of industrial products in a variety of fields such as industry, art, design, construction, handcraft, and city planning where characters such as the Korean alphabet, English alphabet, various foreign languages, numerals and/or are symbolized.

BACKGROUND ART

The Korean alphabet invented by the great king Sejong in 1443 has a scientific principle and formative characteristics that are not found in other characters in the world. Therefore, the Korean alphabet is regarded as a Korean cultural heritage and it is one of the greatest inventions using a scientific principle. However, it is current reality that the Korean alphabet is not being valued and utilized as much in a variety of fields such as industry, art, design, construction and handcraft.

According to a research study, the Korean alphabet may not be utilized industrially because of the following reasons. First, consumers do not prefer the Korean alphabet because they believe that it is not beautiful in design. Second, companies do not apply the Korean alphabet in their goods because of its low profitability. The companies believe that consumers do not prefer it or normally recognize it as tourism product.

In modern times, as image media is developed, the importance of transferring image information other than texting becomes higher. For example, in regard to starvation/refugee relief, it is more appealing when an image combines with characters and/or numerals rather than an appeal with tedious letters and/or numerals only. Therefore, it is desperately needed to symbolize the meaning of the language and make better use of it industrially rather than treat it as simple medium to transfer information. Especially, by symbolizing the characters or numerals of languages in industrial products (articles, artworks, buildings, crafts, and structures) in a variety of fields such as industry, art, design, construction, handcraft, and city building, the value of languages will be reconsidered and reassessed in the industrial sector.

SUMMARY

In some embodiments of the present disclosure, a symbol image editing apparatus and method for converting a character of a language (such as the Korean alphabet, English, etc.) or a numeral to a symbol image, or for outputting an analyzed symbol image against a character of the corresponding language, and a machine readable recording medium having a program recorded thereon for executing the apparatus and method.

Further, some embodiments of the present disclosure may provide a method and apparatus for editing a symbol image, which may promote design development in character-symbolized products such as art work, buildings, and craftwork, and city planning and also facilitate the development of character-symbolized industrial products in various fields such as industry, art, design, construction, handcraft, and city planning, and a machine readable recording medium having a program recorded thereon for executing the method and apparatus.

An exemplary embodiment of the present disclosure may provide a symbol image editing apparatus, the apparatus comprising: a generation unit for converting a character into a symbol image corresponding to the character; and an output unit for displaying or outputting the converted symbol image. The symbol image may be located at a position corresponding to a blank position in an image of the character.

Another exemplary embodiment of the present disclosure may provide a symbol image editing apparatus, the apparatus comprising: a generation unit for converting a symbol image into a character; and an output unit for displaying or outputting the converted character. The symbol image may be located at a position corresponding to a blank position in an image of the character.

In some embodiments, the character may comprise at least one of the Korean character, English character, various language characters and a numeral.

In some embodiments, the symbol image editing apparatus may further comprise: an editing unit for editing or adjusting at least one or more of a size, a position, a color, and a shape of the symbol image.

In some embodiments, the shape of the symbol image may be determined by a shape of blank in the relevant character image.

In some embodiments, the symbol image may have a shape of, for example, but not limited to, a triangle, a rectangle, a circle, and an angular figure.

In some embodiments, the symbol image may be represented as certain divided first spaces representing at least one Korean character, a space division that may divide the first spaces into second spaces by, for instance, but not limited to, a dot, a line, a face or other expression and symbolically represent the Korean character by performing at least one function of an initial consonant, a middle vowel, and a final consonant in the divided second spaces, and at least one symbolic icon of a triangle, a rectangle, a circle, and a line placed in the second spaces that is divided by the space division.

In some embodiments, each of the second spaces may be configured with a longitudinal direction, a horizontal direction, or a combination thereof.

In some embodiments, each of the first spaces may be separately placed in the horizontal direction and/or the longitudinal direction.

In some embodiments, the symbol image may be an overlapped image in which at least two symbol images are overlapped, and the symbol image may comprise an identifier that differently represents at least one of a size, a position, a color, a shape, a light and shade, a brightness, a pattern, and a texture to distinguish each of overlapped symbol images. The identifier may represent a readout order of each of the symbol images.

Another exemplary embodiment of the present disclosure may provide a symbol image editing method, the method comprising: a) converting a character into a corresponding symbol image; and b) outputting or displaying the converted symbol image, wherein the symbol image may be located at a position corresponding to a blank position in the character image that is corresponding to the character information.

Another exemplary embodiment of the present disclosure may provide, a symbol image editing method, the method comprising: a) converting a symbol image into a corresponding character; and b) outputting or displaying the character, wherein the symbol image may be located at a position corresponding to a blank position in an image of the character.

In some embodiments, the character may comprise at least one of the Korean character, English character, various foreign languages and a numeral.

In some embodiments, the symbol image editing method may further comprise: adjusting at least one of a size, a position, a color, and a shape of the symbol image.

In some embodiments, the shape of the symbol image may be determined by a shape of blank in the relevant character image.

In some embodiments, the symbol image may have a shape of, for example, but not limited to, a triangle, a rectangle, a circle, an angular figure.

In some embodiments, the symbol image may be represented as certain divided first spaces representing at least one Korean character, a space division that divides the first spaces into second spaces by a dot, a line, a face or other expression, and symbolically represent the Korean character by performing any one function of an initial consonant, a middle vowel, and a final consonant in the divided second spaces, and at least one symbolic icon of a triangle, a rectangle, a circle, and a line placed in the second spaces that is divided by the space division.

In some embodiments, each of the second spaces may be configured with a longitudinal direction, a horizontal direction, or a combination thereof.

In some embodiments, each of the first spaces may be separately placed in the horizontal direction or the longitudinal direction.

In some embodiments, the symbol image may be an overlapped image in which at least two symbol images are overlapped, and the symbol image may comprise an identifier that differently represents at least one of a size, a position, a color, a shape, a light and shade, a brightness, a pattern, and a texture to distinguish each of overlapped symbol images. The identifier may represent a readout order of each of the symbol images.

Another exemplary embodiment of the present disclosure may provide a symbol image editing method for used in in a symbol image editing apparatus, the method comprising: (a) receiving, at the symbol image editing apparatus, character information; (b) converting, at the symbol image editing apparatus, the character information into character information of a different language having the same meaning; and (c) generating, at the symbol image editing apparatus, a symbol image at a position corresponding to a blank position in the character image that is corresponding to the character information.

In some embodiments, the symbol image editing method may further comprise: after step (c), adjusting at least one of a size, a position, a color, and a shape of the symbol image.

In some embodiments, the shape of the symbol image may be determined by a shape of blank in the character image.

In some embodiments, the symbol image may have a shape of, for example, but not limited to, a triangle, a rectangle, a circle, an angular figure.

In some embodiments, the symbol image editing method may further comprise: after step (c), (d) converting, at the symbol image editing apparatus, a character inputted from an outside into character information of a different language having the same meaning, and additionally generating a symbol image at a position corresponding to a blank position in the character image that is corresponding to the character information.

In some embodiments, the symbol image editing method may further comprise: after step (d), (e) overlapping, at the symbol image editing apparatus, the additionally generated symbol image on the symbol image generated in the step (c).

In the step (e), the symbol image generated in the step (c) and the symbol image generated in the step (d) may be distinguished by at least one of a position, a color, a light and shadow, a brightness, a pattern, a texture, a size, and a shape.

In some embodiments, the step (c) may comprise generating a symbol image at a position corresponding to a blank position in each of images by an initial consonant, a middle vowel, and a final consonant of the Korean alphabet that are corresponding to the converted Korean alphabet information in case that the character of the converted different language is The Korean alphabet.

Another exemplary embodiment of the present disclosure may provide a symbol image editing method for used in a symbol image editing apparatus, the method comprising: (a) receiving, at the symbol image editing apparatus, character information; (b) converting, at the symbol image editing apparatus, the character information into character information of a different language having the same meaning; and (c) generating, at the symbol image editing apparatus, a symbol image corresponding to the character information of the converted different language. The symbol image may be a symbolic icon that is located at a position corresponding to a blank position in the character image which is corresponding to the character information of the converted different language.

Another exemplary embodiment of the present disclosure may provide a recording medium having a program recorded therein to execute each step.

Another exemplary embodiment of the present disclosure may provide a symbol image editing apparatus, the apparatus comprising: an input unit for receiving character information; a conversion unit for converting the character information inputted to the input unit into character information of a different language having the same meaning; and a generation unit for generating a symbol image at a position corresponding to a blank position in the character image that is corresponding to the character information of a different language, which is converted by the conversion unit.

In some embodiments, the symbol image editing apparatus may further comprise: an editing unit for adjusting at least one of a size, a position, a color, and a shape of the symbol image generated by the generation unit.

In some embodiments, a shape of the symbol image may be determined by a shape of blank in the character image.

In some embodiments, the symbol image may be any one of a triangle, a rectangle, and a circle.

In some embodiments, the conversion unit may additionally convert a character inputted from an outside into character information of a different language having the same meaning, and the generation unit may additionally generate a symbol image at a position corresponding to a blank position in the character image that is corresponding to the character information of a different language, which is additionally converted by the conversion unit.

In some embodiments, the apparatus may overlap the additionally generated symbol image on a previously generated symbol image.

In some embodiments, the previously generated symbol image and the additionally generated symbol image may be distinguished by at least one of a color, a position, a light and shadow, a brightness, a pattern, a texture, a size, and a shape.

In some embodiments, the generation unit may generate a symbol image at a position corresponding to a blank position in an image for each of an initial consonant, a middle vowel, and a final consonant of the Korean alphabet that are corresponding to the converted Korean alphabet information in case that the character of the converted different language is The Korean alphabet.

Another exemplary embodiment of the present disclosure may provide a symbol image editing apparatus, the apparatus comprising: an input unit for receiving character information; a conversion unit for converting the character information into character information of a different language having the same meaning; and a generation unit for generating a symbol image corresponding to the character information of the converted different language. The symbol image may be a symbolic icon that is formed at a position corresponding to a blank position in the character image that is corresponding to the character information of the converted different language.

In some embodiments, the symbol image editing apparatus may further comprise: an editing unit for adjusting at least one of a size, a color, a position, and a shape of the symbol image generated by the generation unit.

Another exemplary embodiment of the present disclosure may provide a symbol image editing method for used in a symbol image editing apparatus, the method comprising: (a) inputting a symbol image that a character is shaped; (b) switching the symbol image into a character corresponding to the symbol image; and (c) converting the switched character into character information of a different language having the same meaning. The symbol image may be located at a position corresponding to a blank position in an image of the character.

Another exemplary embodiment of the present disclosure may provide a recording medium having a program recorded therein to execute each step claimed.

Another exemplary embodiment of the present disclosure may provide a symbol image editing apparatus, the apparatus comprising: an input unit for inputting a symbol image that a character is shaped; a generation unit for switching the symbol image into a character corresponding to the symbol image inputted to the input unit; and a conversion unit for converting the switched character by the generation unit into character information of a different language having the same meaning, wherein the symbol image is positioned in a position corresponding to a blank position in an image of the character.

According to some embodiments of the present disclosure, it may come to facilitate design development in various products, artworks, buildings, crafts, city planning in which characters including The Korean alphabet are symbolized.

Also, according to some embodiments of the present disclosure, it may come to promote the development of character (including The Korean alphabet)-symbolized industrial products in a variety of fields such as industry, art, design, construction, handcraft and city planning.

Also, according to some embodiments of the present disclosure, in the case that the user is not familiar with a second language, but only familiar with a first language, it is possible for the user to freely or easily generate and edit a symbol image that the second language having the same meaning as the first language is symbolized.

And also, according to some embodiments of the present disclosure, the user may easily understand the meaning of a symbol image that the information of a character that the user is not able to understand is symbolized as a familiar language to oneself.

BRIEF DESCRIPTION OF DRAWINGS

FIGS. 7A to 7F are diagrams explaining an area in which a symbol image for initial consonants, middle vowels, and final consonants of the Korean alphabet in accordance with an embodiment of the present invention.

FIGS. 12A and 12B are diagrams illustrating an example of the edited Korean alphabet image in accordance with an embodiment of the present invention.

FIG. 13 is a diagram illustrating a use of dots in a space division in accordance with an embodiment of the present invention.

FIG. 18A to FIG. 22 are diagrams illustrating free transformations of space division in accordance with an embodiment of the present invention.

FIG. 26 is a diagram illustrating an example that each of symbols, figure shaped objects, and characters is used as symbolic icons in accordance with an embodiment of the present invention.

FIGS. 27A and 27B are diagrams illustrating an example that a picture is placed in a space and a stamp is used as a symbolic icon.

FIGS. 31A to 31D are diagrams illustrating an overlapped example in which characters are overlapped in accordance with an embodiment of the present invention.

FIG. 34A to FIG. 38 are diagrams illustrating a symbol image for a reversal character in accordance with an embodiment of the present invention.

FIG. 41 is a diagram illustrating a symbol image having overlap mark in English characters.

FIGS. 42A to 42C are diagrams illustrating space division types in English characters.

FIGS. 43A to 43C are diagrams illustrating a marked symbol image according to space division in English characters.

DETAILED DESCRIPTION

Hereinafter, exemplary embodiments of the present invention will be described in detail with reference to the accompanying drawings. In the following description, well-known functions or constitutions will not be described in detail if they would obscure the invention in unnecessary detail.

In some embodiments of the present disclosure, 'symbol image' may symbolically represent a character based on a concept that geometrically represents a character to a shape of a triangle, a rectangle, and a circle that is a principle of creation of the Korean alphabet and a consonant and vowel of the Korean alphabet, and a symbolic icon is placed in a part of space divided by dividing a space (space division) in a certain divided space (for example, a rectangular image frame). Further, the symbol image corresponding to English characters or numerals expresses the English alphabet or numerals symbolically. It is the symbol that occupies a part of a certain divided space (for example, rectangular image frame). In this case, the symbol is formed by putting characters or numerals of the language (the Korean alphabet, English alphabet, etc.) in a predetermined frame and then by simplifying the identified shape from the empty space into dot, line and face. In this process, the dot can have a variety of shapes including triangle, rectangle, circle, etc. In addition, it may be defined as means representing a position of empty space (blank) recognized in the above.

As such, in the present invention, since 'symbol image' is configured with a dot of a variety of shape when a size of symbolic icons such as a triangle, a rectangle, and a circle, etc. is expressed small, 'dot image' is used as a meaning equal to 'symbol image' and 'symbolic icon'.

Figures 44A, 44B, 44C:
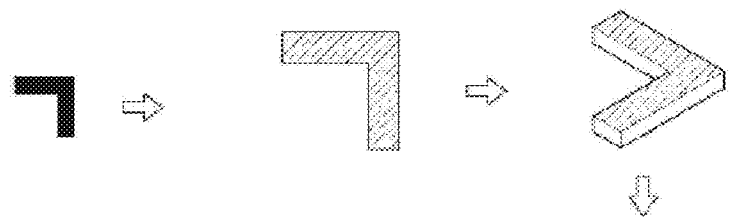
FIGS. 44A to 44J are diagrams explaining a principle to generate a symbol image in accordance with an embodiment of the present invention.

FIGS. 44A to 44J are diagrams explaining a principle to generate a symbol image in accordance with an embodiment of the present disclosure. FIGS. 44A to 44J show one example of concept how to create a symbol image about the Korean character 'ㄱ'. Firstly, the character 'ㄱ' displayed in line as shown in FIG. 44A may be displayed as a face having an area as shown in FIG. 44B.

Figures 44D, 44E, 44F:
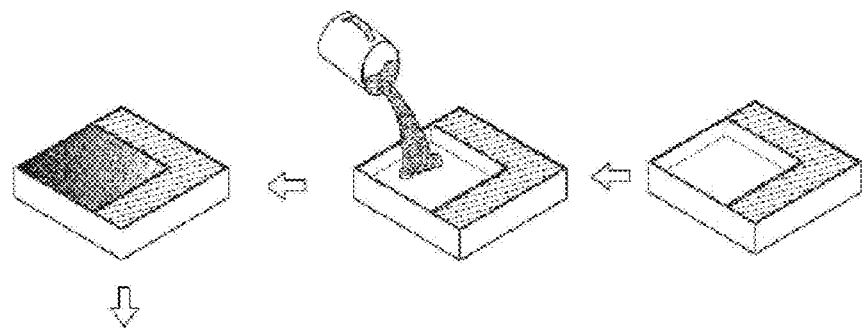

Next, as shown in FIG. 44C, the face having the area shown in FIG. 44B may displayed as a three-dimensional structure having a volume and mass, and then, as shown in FIG. 44D, an outer rim may be installed to the three-dimensional structure shown in FIG. 44C.

Next, as shown in FIG. 44E, a coagulable fluid material, such as molten metal, may be filled in an empty space formed in the outer rim, and then, as shown in FIG. 44F, the molten metal filled in the empty space may be coagulated.

Figures 44G, 44H, 44I:
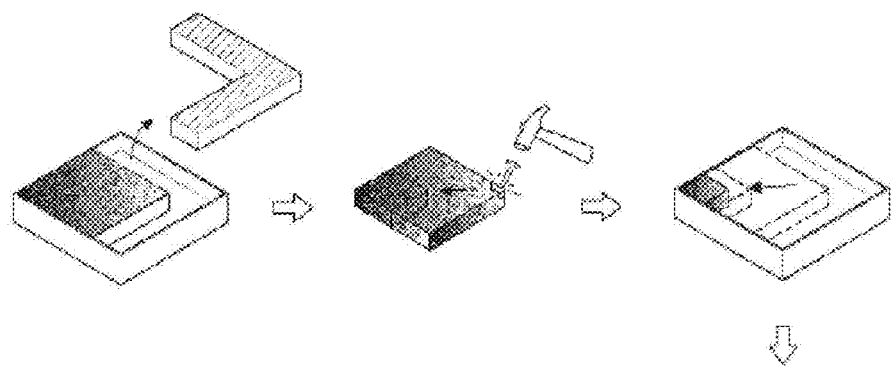

Next, as shown in FIG. 44G, the three-dimensional structure corresponding to the character 'ㄱ' may be removed, and, as shown in FIGS. 44H and 44I, the size of the coagulated metal may be reduced.

Figure 44J:
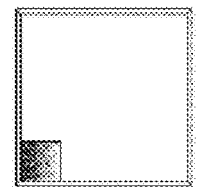

As shown in FIG. 44I, in the outer rim, the size of the coagulated metal may be gradually reduced in a predefined direction, for instance, but not limited to, a direction from the top and/or right sides. Accordingly, as shown in FIG. 44J, a symbol image corresponding to the character 'ㄱ' may be displayed or appeared by the reduced metal and the outer rim. The same or substantially similar concept or principal may be applied to other characters including, for example, but not limited to, numerals and alphabets to configure them as symbol images. Each of other characters including numerals and alphabets may also be configured to symbol images by such concept or principle.

Figure 1:
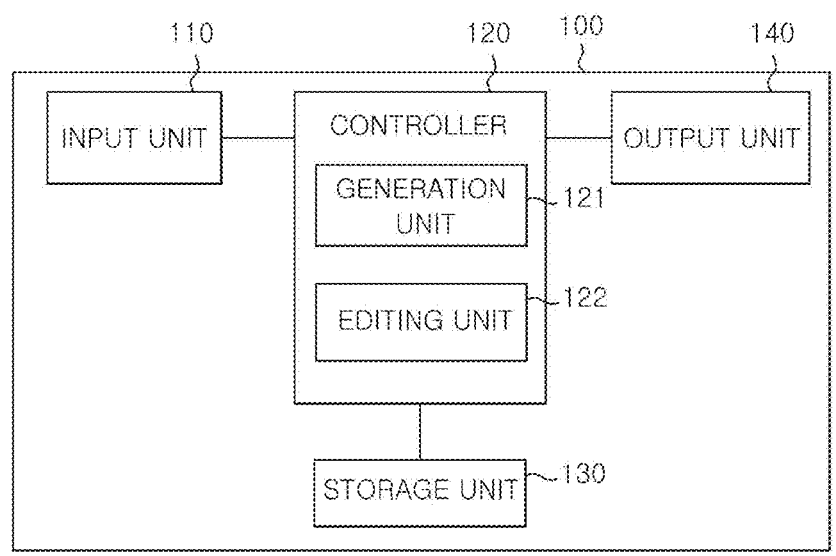
FIG. 1 is a diagram showing a configuration of a symbol image editing apparatus to which the present invention may be applied.

Meanwhile, FIG. 1 is a diagram showing a configuration of a symbol image editing apparatus according to an exemplary embodiment of the present disclosure. As shown in FIG. 1, the symbol image editing apparatus 100 may include an input unit 110, a controller 120, a storage unit 130, and an output unit 140. The symbol image editing apparatus 100 may be a standalone device (see, a first embodiment described below). The symbol image editing apparatus 100 may be comprised in a communication terminal which may communicate with other devices (as a device equal to the symbol image editing apparatus 100, other communication terminal is equipped with it or it is interlocked with other communication terminal) of the outside through a data communication network (see second and third embodiments described below). The data communication network may be, for example, but not limited to, wire/wireless telephone network and Internet, Bluetooth, etc. The communication terminal may be a communication device having a wire/wireless communication function, such as wire/wireless telephones, SIP terminals, cellular phones, PDAs (Personal Digital Assistant), personal computers (PC), handheld PC, laptop computers equipped with wire/wireless modem, smart devices, smart glasses, smart cameras, smart watches, black-boxes, navigation devices, image recording devices, and smart TVs, etc.

As a first embodiment, the symbol image editing apparatus 100 may convert characters including, for example, but not limited to, numerals, various languages (such as Korean alphabet, English alphabet, etc.) and any characters or symbols inputted through the input unit 110 into symbol images and may output the symbol images through the output unit 140 in real time. In addition, the symbol image editing apparatus 100 may analyze the symbol images inputted through the input unit 110 and then output characters of the relevant language (including numerals) through the output unit 140 in real time. In the first embodiment, all of input/output processes may be performed in the symbol image editing apparatus 100.

As a second embodiment, the symbol image editing apparatus 100 may delivers information of characters including, for example, but not limited to, numerals, various languages (such as Korean alphabet, English alphabet, etc.), and any characters or symbols inputted through the input unit 110 to other device of the outside. In addition, the symbol image editing apparatus 100 may analyze symbol images inputted through the input unit 110 and then deliver information of characters of the language (including numerals) to other device of the outside.

As a third embodiment, the symbol image editing apparatus 100 may converts characters including, for instance, but not limited to, numerals, various languages (such as Korean alphabet, English alphabet, etc.) and any characters or symbols delivered from other device of the outside into symbol images and may output the symbol images through the output unit 140 in real time. In this embodiment, other device of the outside may deliver information of characters including numerals, various languages (such as Korean alphabet, English alphabet, etc.) and any characters and/or symbols to the symbol image editing apparatus 100, or may analyze symbol images inputted through the input unit 110 and deliver the information of characters of the relevant language (including numerals) to the symbol image editing apparatus 100. In the third embodiment, an input process may be performed through other device of the outside and an output process may be performed in the symbol image editing apparatus 100.

Meanwhile, in a fourth embodiment, while the input process may be performed through other device of the outside, the output process may not be performed in the symbol image editing apparatus 100, but through another device of the outside.

In accordance with the second and third embodiments, the other device of the outside may be the same device as the symbol image editing apparatus 100. A communication terminal may be equipped with it or the other device of the outside may be operated by associating with a communication terminal. Further, the other device of the outside may be a device that communicates with the symbol image editing apparatus 100 through a data communication network.

A symbol image may be generated in the position corresponding to a blank position in a character or numeral image, and may be determined by a shape of the blank in the relevant character or numeral image.

For example, a symbol image corresponding to the Korean alphabet character may be a symbolically represented Korean alphabet character, and/or may have a symbolic icon that is placed in a part of divided space after dividing a space to distinguish an initial consonant, a middle vowel, and a final consonant at certain divided space that represents at least one Korean alphabet character. In case of some characters (for example, ㅡ, ㅗ, ㅓ of the Korean alphabet vowel and the English lower-case letter l, numeral 1, etc.), there might be a case that the symbolic icon is not placed, not at all.

In addition, a symbol image corresponding to English alphabet or numeral may be a symbolically represented English alphabet or numeral, and may have the symbolic icon that is placed in a part of certain divided space representing at least one English alphabet or numeral.

In accordance with the second and third embodiments, since the input/output process of the other device of the outside may be the same as the input/output process of the symbol image editing apparatus 100, the first embodiment will be mainly described below.

The controller 120 may convert information of characters of the language (such as Korean alphabet, English alphabet, etc.) or numeral, which is inputted from the input unit 110 according to the first embodiment or received from other device of the outside according to the third embodiment, into a symbol image and control to display or output the symbol image through the output unit 140 or to print out it by using a printer.

The controller 120 may comprise a generation unit 121 and an editing unit 122. In accordance with an embodiment, a generation unit 121 may generate a symbol image at the position corresponding to a blank position in a character/numeral image applied to character or numeral information inputted through the input unit 110. The output unit 140 may output the generated symbol image by, for example, but not limited to, displaying the generated symbol image on the display device or screen or printing out the generated symbol image. The generated symbol image may be stored in the storage unit 130.

In addition, in a state that each of the symbol images generated according to some exemplary embodiments of the image generation principle is mapped to characters/numerals inputted by a user and is stored in the storage unit 130, the generation unit 121 may extract symbol images mapped to characters or numerals inputted by the user and display the extracted symbol images on the screen or print out them by the output unit 140.

In accordance with another embodiment, the generation unit 121 may analyze symbol images inputted through the input unit 110, extract symbol images mapped to characters or numerals inputted by the user and stored in the storage unit 130, and outputs the symbol images corresponding to relevant characters or numerals through the output unit 140.

The editing unit 122 may perform an editing function. For example, the editing unit 122 may edit symbol images outputted from or displayed on the screen of the output unit 140 according to an editing command when a user inputs the editing command to change or adjust a size or position of the symbol images through the input unit 110 (image editing function in the output process). In addition, the editing unit 122 may freely edit and configure certain divided space (for example, a rectangular image frame) that symbol images are represented and space division separating or dividing certain divided space (for example, space division to distinguish an initial consonant, a middle vowel, and a final consonant) is divided (space editing function in the input/output process).

In accordance with an embodiment, the input unit 110 may be used to input character or numeral information of the language that a user wants to output (display or print out) as a symbol image. Additionally, the input unit 110 may be configured to input the editing command to edit the generated symbol image.

In accordance with another embodiment, the input unit 110 may be used to input the symbol image that the user wants to output (display or print out) as a character or numeral of the language. Additionally, the input unit 110 may be configured to input the editing command to edit the symbol image inputted by the user.

In accordance with yet another embodiment, the input unit 110 may be used to input an editing command related to certain divided space (for example, rectangular image frame) that symbol images are represented and space division separating or dividing certain divided space (for example, space division to distinguish an initial consonant, a middle vowel, and a final consonant).

The input unit 110 may comprise at least one of a keypad, a touch screen unit, a mouse pad, a mouse, an optical pen, an electric signal sensor, any input devices, etc. Naturally, it is possible to input a character/numeral by using a keypad instead of a touch screen unit, and it is also possible to input a character/numeral by using a touch screen unit instead of a keypad. In the preferred embodiment, a device only equipped with a keypad, or a device only equipped with a touch screen unit, or a device equipped with a keypad, a touch screen unit, and an electric signal sensor may be included in the input unit 110, but not limited thereto.

Figure 24:
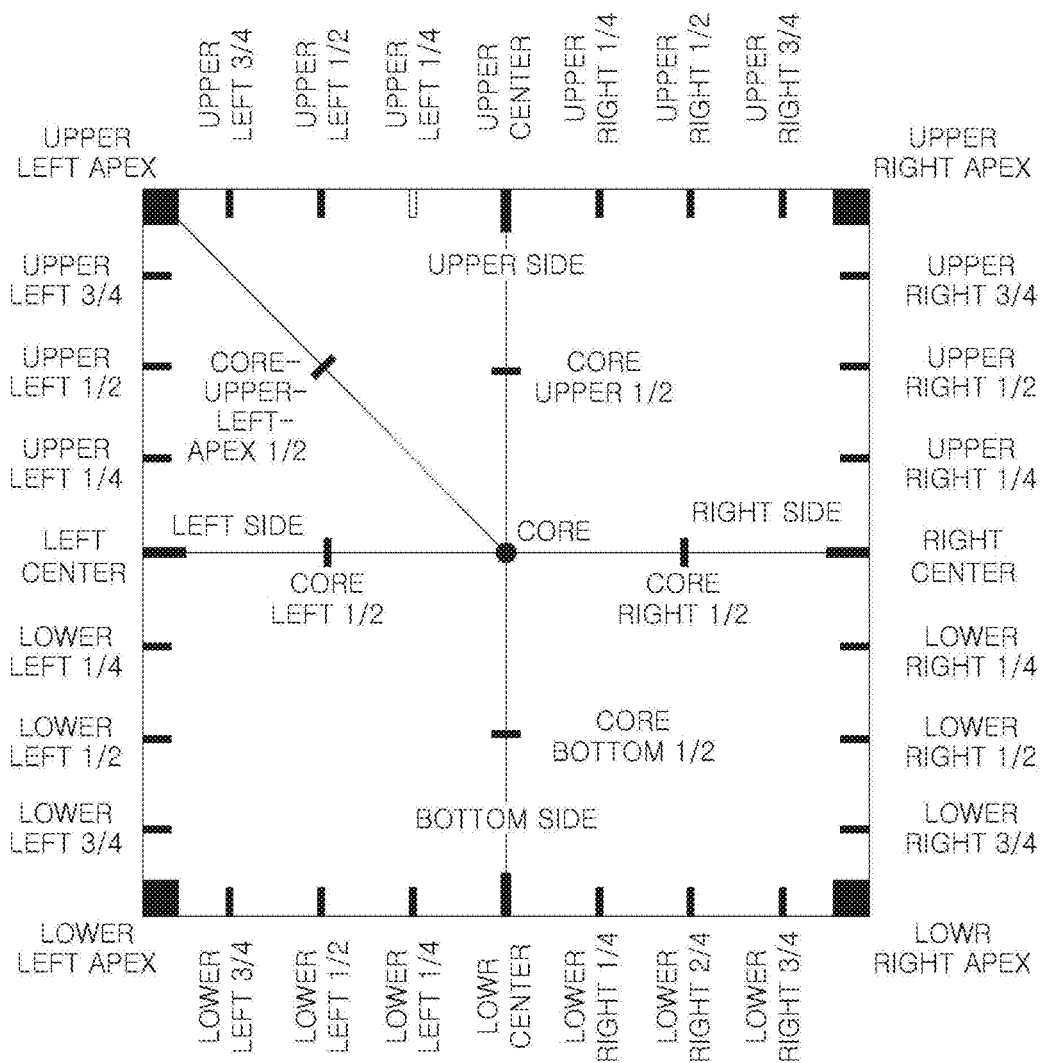
FIG. 24 is a diagram illustrating a coordinate that defines a position of symbolic icons in space division in accordance with an embodiment of the present invention.

In addition, sensing movement or motion with an electric signal sensor may generate a symbol image by inputting an operating signal with human body or eyes, or brainwave with reference to coordinates at which the symbol image is located as shown in FIG. 24.

The keypad may comprises one or more key buttons to input numerals and/or special characters or characters. In addition, the keypad may further comprise one or more functional buttons for storing, correcting and recalling the inputted/outputted characters/numerals and a general button, and may perform function of medium to deliver an instruction of a user to the controller 120. Provided that the user puts certain pressure on character (consonant, vowel)/numeral keys by using hands (or provided that a micro current is applied or an operation of the user is recognized by a sensor), the keypad may generate data needed to recognize the corresponding characters/numerals, that is, a key data and transfer it to the controller 120. The controller 120 may recognize characters/numerals code data corresponding to the applied key data at the storage unit 130, extract a symbol image mapped to the characters/numerals code data, and may output it through the output unit 140 by displaying it on the screen or printing it out. Hard-key configuration of the keypad for inputting characters or numerals, and characters/numerals recognition and combination method through the keypad may be implemented.

In addition, a touch screen device may be one of object-oriented character/numeral information input devices. Provided that a user puts certain pressure on the panel displaying characters (consonant, vowel)/numerals by using hands or an input device or tool such as a stylus pen, etc., the touch screen device may generate data needed to recognize the corresponding characters/numerals, that is, a touch screen data and transfer them to the controller 120. The controller 120 may recognize characters/numerals code data corresponding to the applied touch screen data at the storage unit 130. Then, the controller 120 may extract a symbol image mapped to the characters/numerals code data, and may output the symbol image by displaying it or printing it out. Soft-key configuration of the touch screen device for inputting characters or numerals, and characters/numerals recognition and combination method through the touch screen device may be implemented.

The storage unit 130 may store a program for driving or perform a function processed by the controller 120 and certain program for implementing convenience for a user and several basic functions. For example, the storage unit 130 may comprise a volatile memory such as RAM or a non-volatile memory such as a flash memory, and a control program to generally control overall operation of the device or an operating program to process data inputted from the input unit 110 may be stored in the storage unit 130. The storage unit 130 may have key data processed in accordance with an embodiment of the present invention or characters/numerals code data corresponding to the touch screen and symbol images mapped to characters/numerals code data. The symbol images mapped to characters/numerals code data will be described below.

The output unit 140 may perform, for example, but not limited to, a displaying operation or printing out operation in response to or in accordance with the control of the controller 120. In accordance with an embodiment, symbol image information outputted to the output unit 140 may be information corresponding to characters/numerals information inputted through the input unit 110. That is, when a user inputs characters/numerals, characters/numerals code data corresponding to the characters/numerals may be extracted.

Then, the symbol image mapped to the characters/numerals code data may be outputted by displaying the symbol image on the display screen or printing out the symbol image. In accordance with another embodiment, characters/numerals information outputted to the output unit 140 may be information corresponding to the image information inputted through the input unit 110. That is, when a user inputs characters/numerals, the characters/numerals may be analyzed and characters/numerals code data corresponding to the characters/numerals may be extracted. Then, the symbol image mapped to characters/numerals code data may be outputted by displaying the symbol image on the display screen or printing out the symbol image.

For example, in the Korean alphabet, initial consonants of the Korean alphabet may be represented with total 19 consonants in the Korean character input mode. Specifically, the number of short consonants may be 14 ('ㄱ', 'ㄴ', 'ㄷ', 'ㄹ', 'ㅁ', 'ㅂ', 'ㅅ', 'ㅇ', 'ㅈ', 'ㅊ', 'ㅋ', 'ㅌ', 'ㅍ', 'ㅎ') and the number of pair-consonants may be 5 ('ㄲ', 'ㄸ', 'ㅃ', 'ㅆ', 'ㅉ'). In addition, middle vowels may be represented with total 21 vowels. Specifically, the number of short vowels may be 10 ('ㅏ', 'ㅓ', 'ㅗ', 'ㅜ', 'ㅡ', 'ㅣ', 'ㅐ', 'ㅔ', 'ㅚ', 'ㅟ') and the number of double vowels may be 11 ('ㅑ', 'ㅕ', 'ㅛ', 'ㅠ', 'ㅒ', 'ㅖ', 'ㅘ', 'ㅙ', 'ㅝ', 'ㅞ', 'ㅢ'). In addition, final consonants may be represented with total 27 consonants. Specifically, the number of short consonants have be 14, the number of pair-consonants may be 5 and the number of double consonants may be 11 ('ㄳ', 'ㄵ', 'ㄶ', 'ㄺ', 'ㄻ', 'ㄼ', 'ㄽ', 'ㄾ', 'ㄿ', 'ㅀ', 'ㅄ').

As such, the symbol image editing apparatus 100 may be outputs characters of the language (Korean alphabet, English alphabet, etc.), numerals and/or any characters or symbols as symbol images, or the symbol image editing apparatus 100 may analyze symbol images, and output as characters (including numerals) of the relevant language. As described above, a symbol image corresponding to the Korean alphabet character may symbolically represent a character or a numeral of the language, and the symbol image may be a symbolic icon which is placed in a part of the space divided (space division) by separating the space in certain divided space (for example, rectangular image frame) representing at least one Korean alphabet character (at least one syllable). These symbolic icons may simplify shapes that are identified from an empty space after putting characters of the language (Korean alphabet, English alphabet, etc.), numerals or symbols into a cast as a dot, a line, and a face, etc. For example, the dot may have a variety of shapes such as a triangle, a rectangle, and a circle, etc.

Figure 2:
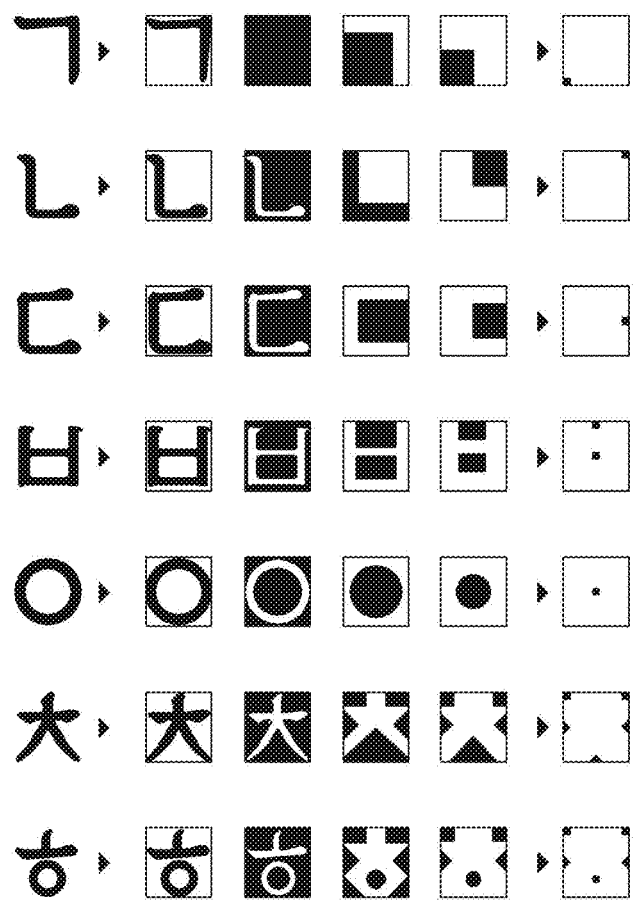
FIG. 2 is a diagram illustrating a procedure to extract a symbol image in accordance with an embodiment of the present invention.

A symbol image that symbolizes a character or a numeral of the language may represent characters or numerals of the language as an object with a three-dimensional structure having a volume and a mass rather than a flat or plane object. The symbol image may be based on characters/numerals processing technology simply and symbolically representing the character or the numeral with an original cast by processing a casting that is obtained by pouring molten material such as molten metal into an empty space after putting the symbol image into the cast. Exemplary embodiments of the steps for processing characters or numerals are illustrated in FIG. 2. Spatial concept may be applied to a representation of characters of the language, numerals, or symbols and simplify them as a simplified space. After extracting the symbolic icon that may be simplified to represent as a triangle, a rectangle, a circle, etc. by processing the characters, numerals or symbols, a symbol image may be placed in the space and it may symbolically represent characters, of the language, numerals or symbols. In this case, a size, a color, a shape, and a position of the symbolic icon may be changed.

Accordingly, the symbol image of the Korean alphabet character outputted from the output unit 140 may be represented as certain divided first spaces representing at least one Korean alphabet character (at least one syllable), a space division that may divide the first spaces by using a dot, a line, a face or other signs (divides the first space into second spaces) and may symbolically represent the Korean alphabet character by performing any one function of an initial, a middle vowel and a final initial in the second spaces, and a symbolic icon of a triangle, a rectangle, a circle, and a line placed in the second spaces that are separated into the space division. Herein, each of the second spaces divided by space division may be configured with a transversal direction or a longitudinal direction or a combination thereof, and each first space may be separately placed in the transversal direction or longitudinal direction. And, symbolic icons may be at least one of the objects having a shape of, for example, but not limited to, triangle, rectangle, circle and polygon, and characters that remind of the polygon, the image or other symbolic icons.

As an exemplary embodiment, the principle generating a symbol image corresponding to a character of the Korean alphabet character is described as follows.

FIG. 3 to FIG. 5 are diagrams illustrating the principle generating the symbol image corresponding to the Korean alphabet character in accordance with an embodiment of the present disclosure. FIG. 6 illustrates an initial consonant, a middle vowel, and a final consonant of the Korean alphabet characters used with a dot, a line, and a face. FIG. 7 is a diagram illustrating an initial consonant, a middle vowel, and a final consonant of the Korean alphabet by using the space division. As described above, the space division, for example, may divide a space to distinguish the initial consonant, the middle vowel, and the final consonant of the Korean alphabet character.

Figure 3A:
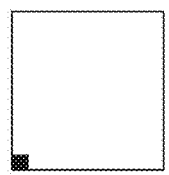
FIGS. 3A to 3S are diagrams illustrating a principle to generate a symbol image corresponding to initial consonants of the Korean alphabet in accordance with an embodiment of the present invention.
Figure 3B:
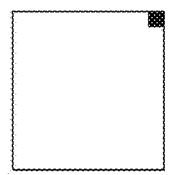
Figure 3C:
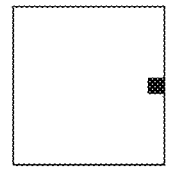
Figure 3D:
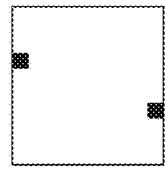
Figure 3E:
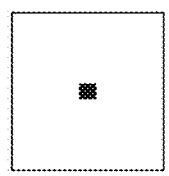
Figure 3F:
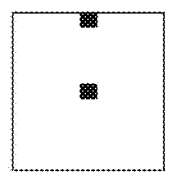
Figure 3G:
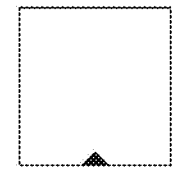
Figure 3H:
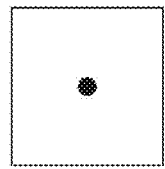
Figure 3I:
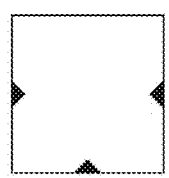
Figure 3J:
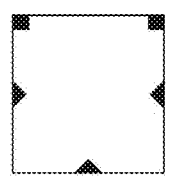
Figure 3K:
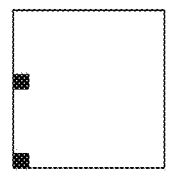
Figure 3L:
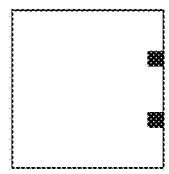
Figure 3M:
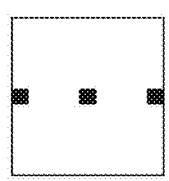
Figure 3N:
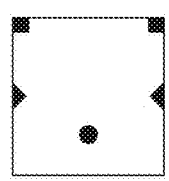
Figure 3O:
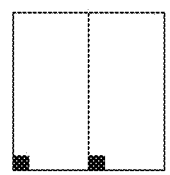
Figure 3P:
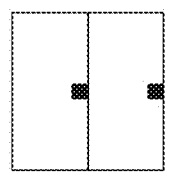
Figure 3Q:
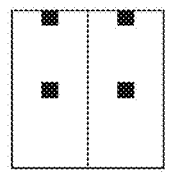
Figure 3R:
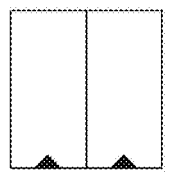
Figure 3S:
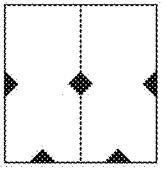

First, FIGS. 3A to 3S illustrate exemplary embodiments for generating dot images corresponding to initial consonants of the Korean alphabet characters. Specifically, FIG. 3A illustrates a rectangular dot image generated based on the empty rectangular shape as shown at the lower left corner of 'ㄱ'; FIG. 3B illustrates a rectangular dot image generated based on the empty rectangular shape as shown in the upper right corner of 'ㄴ'; FIG. 3C illustrates a rectangular dot image generated based on the empty rectangular shape as shown at the middle right corner of 'ㄷ'.

In addition, FIG. 3D illustrates rectangular dot images generated based on the empty rectangular shape as shown in 'ㄹ', and FIG. 3E illustrates a rectangular dot image generated based on the empty rectangular shape as shown at the center of 'ㅁ'. Also, FIG. 3F illustrates rectangular dot images generated based on the empty rectangular shapes as shown at the center and middle upper side of 'ㅂ', FIG. 3G illustrates a triangular dot image generated based on the triangular shape at the middle bottom side of 'ㅅ', and FIG. 3H illustrates a circular dot image generated based on the circular shape as shown at the center of 'ㅇ'.

For reference, in accordance with exemplary embodiments of the present disclosure, when the shape of empty space in each image of the Korean alphabet character is a rectangle, triangle or circle, a dot image whose shape is identical to the shape of empty space may be generated. In case of having a good discrimination from other characters, a part of empty space of the symbol may be deleted. In addition, it is possible to generate a symbol image that is different from an empty space in the position of empty space on each of images of the Korean alphabet, since the empty space determines a unique characteristic of characters.

When analyzing the remaining dot images in FIGS. 3I to 3S in accordance with the exemplary embodiments described above, it can be understood that FIG. 3I illustrates a dot image corresponding to 'ㅈ'; FIG. 3J illustrates a dot image corresponding to 'ㅊ'; FIG. 3K illustrates a dot image corresponding to 'ㅋ'; FIG. 3L illustrates a dot image corresponding to 'ㅌ'; FIG. 3M illustrates a dot image corresponding to 'ㅍ'; FIG. 3N illustrates a dot image corresponding to 'ㅎ'; FIG. 3O illustrates a dot image corresponding to 'ㄲ'; FIG. 3P illustrates a dot image corresponding to 'ㄸ'; FIG. 3Q illustrates a dot image corresponding to 'ㅃ'; FIG. 3R illustrates a dot image corresponding to 'ㅆ'; and FIG. 3S illustrates a dot image corresponding to 'ㅉ'.

Figures 4A, 4B, 4C, 4D:
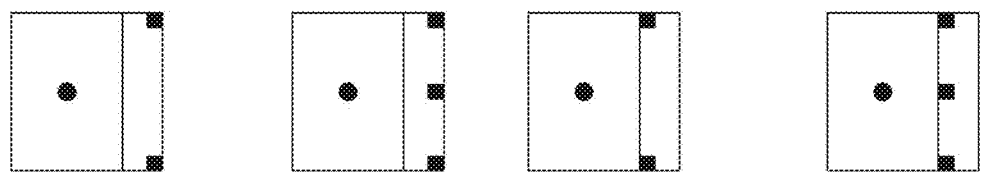
FIGS. 4A to 4U are diagrams illustrating a principle to generate a symbol image corresponding to middle vowels of the Korean alphabet in accordance with an embodiment of the present invention.
Figures 4E, 4F, 4G, 4H:
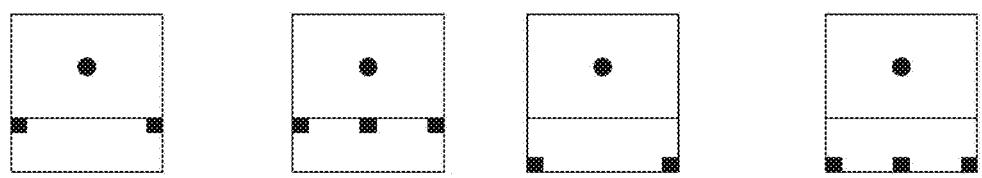
Figures 4I, 4J, 4K, 4L:
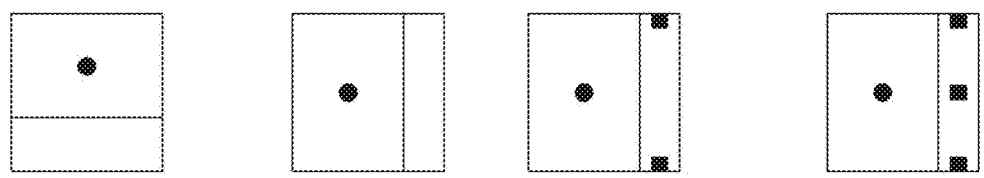
Figure 4M:
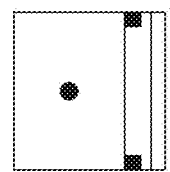
Figure 4N:
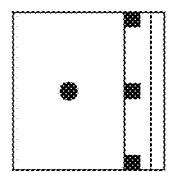
Figure 4O:
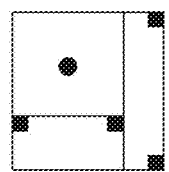
Figure 4P:
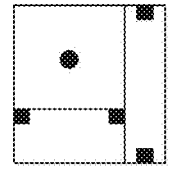
Figure 4Q:
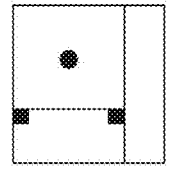
Figure 4R:
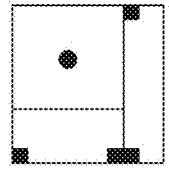
Figure 4S:
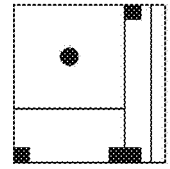
Figure 4T:
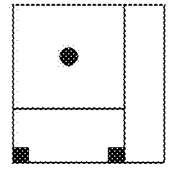
Figure 4U:
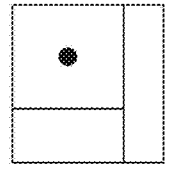

Meanwhile, FIGS. 4A to 4U illustrate exemplary embodiments for generating dot images corresponding to characters combined with an initial consonant and a middle vowel of the Korean alphabet. The consonant 'ㅇ' may be represented to easily recognize without solely representing a vowel. When generating the symbol image corresponding to the character combined with the initial consonant and the middle vowel, as illustrated in FIGS. 4A to 4U, firstly the rectangular image frame in FIG. 3 may be divided into the initial consonant area and the middle vowel (referred to as 'space division'), as illustrated in FIGS. 7A, 7B, and 7C, and each symbol image corresponding to an initial consonant and a middle vowel may be independently generated in the initial consonant image frame and the middle vowel image frame.

The principle to generate the symbol image corresponding to the initial consonant on the initial consonant image frame described in the embodiments shown in FIGS. 3A to 3S is the same as the principle for generating symbol images corresponding to the middle vowel on the middle vowel image frame. The rectangular symbol image having the same shape as that of the empty space may generated in the position corresponding to the empty space position on the middle vowel image.

When analyzing characters indicated by each symbol image in FIGS. 4A-4U in accordance with the exemplary embodiments to generate the symbol image above, FIG. 4A is a symbol image corresponding to '아'; FIG. 4B is a symbol image corresponding to '야'; FIG. 4C is a symbol image corresponding to '어'; FIG. 4D is a symbol image corresponding to '여'; FIG. 4E is a symbol image corresponding to '오'; FIG. 4F is a symbol image corresponding to '요'; FIG. 4G is a symbol image corresponding to '우'; FIG. 4H is a symbol image corresponding to '유'; FIG. 4I is a symbol image corresponding to '으'; FIG. 4J is a symbol image corresponding to '이'; FIG. 4K is a symbol image corresponding to '애'; and FIG. 4L is a symbol image corresponding to '얘'.

Meanwhile, in case of a single vowel 'ㅔ' and a double vowel 'ㅖ' among middle vowels, in order to separate them from 'ㅓ' and 'ㅕ', respectively, it is desirable to divide the middle vowel image frame by two in the longitudinal direction as illustrated in FIGS. 4M and 4N so that 'ㅔ' can be written by combination of 'ㅓ' and 'ㅣ' and 'ㅖ' can be written by combination of 'ㅕ' and 'ㅣ'. Accordingly, FIG. 4M represents a symbol image corresponding to '에', and FIG. 4N represents a symbol image corresponding to '예'.

Meanwhile, in the case of double vowels, it is desirable to generate each dot image of vowels independently after dividing the middle vowel image frame into a lower part and a right part from the whole rectangular image frame. Accordingly, FIG. 4O represents a symbol image corresponding to '와'; FIG. 4P represents a symbol image corresponding to '왜'; FIG. 4Q represents a symbol image corresponding to '외'; FIG. 4R represents a symbol image corresponding to '워'; FIG. 4S represents a symbol image corresponding to '웨'; FIG. 4T represents a symbol image corresponding to '위'; and FIG. 4U represents a symbol image corresponding to '의'.

Meanwhile, when generating a symbol image corresponding to a character combined with an initial consonant, a middle vowel and a final consonant, as illustrated in FIGS. 7D to 7F, firstly the rectangular image frame in FIG. 3 may be divided into an initial consonant area, a middle vowel area and a final consonant area (it is referred to as 'space divisions'), and each symbol image corresponding to the initial consonant, the middle vowel and the final consonant may be independently generated in the initial consonant image frame, middle vowel image frame and final consonant image frame.

FIGS. 5A to 5K show exemplary embodiments for generating a symbol image corresponding to a final consonant of the Korean alphabet on a final consonant image frame. 14 single consonants ('ㄱ', 'ㄴ', 'ㄷ', 'ㄹ', 'ㅁ', 'ㅂ', 'ㅅ', 'ㅇ', 'ㅈ', 'ㅊ', 'ㅋ', 'ㅌ', 'ㅍ', 'ㅎ') and 2 pair-consonants ('ㄲ', 'ㅆ') of the initial consonants of the Korean alphabet, as illustrated in FIGS. 3A to 3S, can be used as the final consonants, and exemplary embodiments for generating symbol images corresponding to 11 double-consonants ('ㄳ', 'ㄵ', 'ㄶ', 'ㄺ', 'ㄻ', 'ㄼ', 'ㄽ', 'ㄾ', 'ㄿ', 'ㅀ', 'ㅄ') that are used as the final consonants of the Korean alphabet are shown in FIGS. 5A to 5K.

In the case of double-consonants used only in final consonants, not in initial consonants among the pair-consonants of the Korean alphabet, the final consonant image frame may be divided into two areas as in other pair-consonants of the Korean alphabet, and a symbol image corresponding to each consonant may be generated on each divided image frame.

Figure 5A:
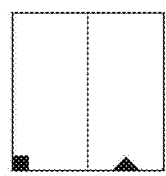
FIGS. 5A to 5K are diagrams illustrating a principle to generate a symbol image corresponding to a final consonant of the Korean alphabet in accordance with an embodiment of the present invention.
Figure 5B:
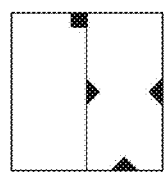
Figure 5C:
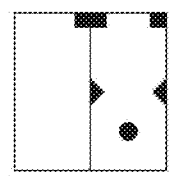
Figure 5D:
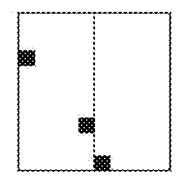
Figure 5E:
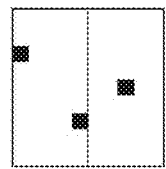
Figure 5F:
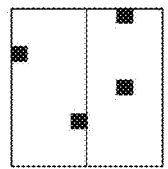
Figure 5G:
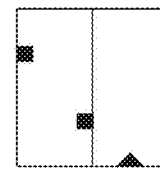
Figure 5H:
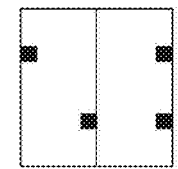
Figure 5I:
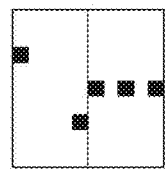
Figure 5J:
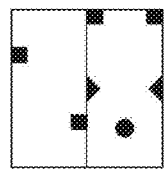
Figure 5K:
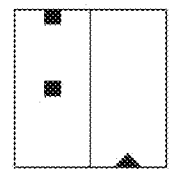

Accordingly, FIG. 5A represents a symbol image corresponding to 'ㄱㅅ'; FIG. 5B represents a symbol image corresponding to 'ㄴㅈ'; FIG. 5C represents a symbol image corresponding to 'ㄴㅎ'; FIG. 5D represents a symbol image corresponding to 'ㄹㄱ'; FIG. 5E represents a symbol image corresponding to 'ㄹㅁ'; FIG. 5F represents a symbol image corresponding to 'ㄹㅂ'; FIG. 5G represents a symbol image corresponding to 'ㄹㅅ'; FIG. 5H represents a symbol image corresponding to 'ㄹㅌ'; FIG. 5I represents a symbol image corresponding to 'ㄹㅍ'; FIG. 5J represents a symbol image corresponding to 'ㄹㅎ'; and FIG. 5K represents a symbol image corresponding to 'ㅂㅅ'.

Figure 6A:
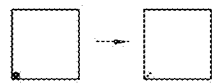
FIGS. 6A to 6P are diagrams explaining a principle to transform and generate a symbol image in accordance with an embodiment of the present invention.
Figure 6B:
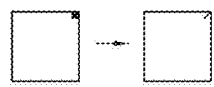
Figure 6C:
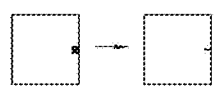
Figure 6D:
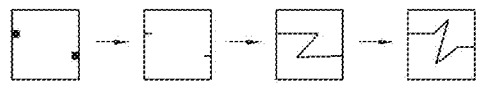
Figure 6E:
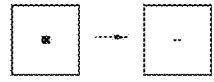
Figure 6F:
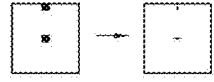
Figure 6G:
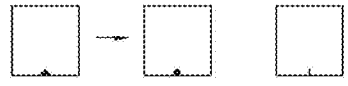
Figure 6H:
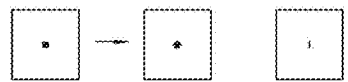
Figure 6I:
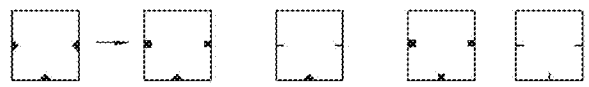
Figure 6J:
Figure 6K:
Figure 6L:
Figure 6M:
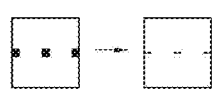
Figure 6N:
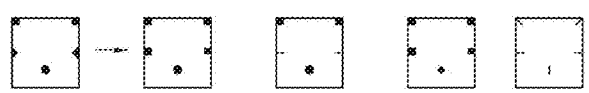
Figure 6O:
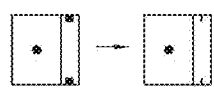
Figure 6P:
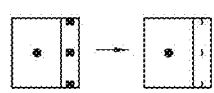

As such, a symbol image may be generated in accordance with a principle of FIG. 3 to FIG. 5, may also be generated or changed in accordance with a transformed shape of symbol as illustrated in FIGS. 6A to 6P.

FIGS. 6A to 6P illustrate transformational examples showing possibility of mutual transformation of a circle symbol image, a diamond-shaped symbol image, a vertical segmented symbol image, a rectangle symbol image, a triangle image, and the vertical segmented symbol image. Herein, a direction, width, height, and a diagonal, etc. of the vertical segmented symbol image may be determined by, for example, but not limited to, a position of the symbol image before the transformation.

For example, rectangular symbols of symbol type indicating a vowel as in FIGS. 6O and 6P may be substituted with a short longitudinal segment, left and right rectangular symbols of symbol type indicating ' ㄹ ' shown in FIG. 6D may be substituted with transversal segments, or by connecting a transversal segment to a diagonal segment. Alternatively, the left and right rectangular symbols of symbol type indicating ' ㄹ ' may be expressed in the form of 'z', or be a lightening-shaped 'Z'.

Further, as illustrated in FIGS. 6I, 6J and 6N, a rectangular or triangle symbols included in the symbol images indicative of ' ㅈ ', ' ㅊ ', and ' ㅎ ' may mutually be substituted, or may be generated by substituting them to short transversal segments. In addition, diagonal segments may substitute the symbol images located at the vertex.

In addition, as such in FIG. 6K, a rectangle symbol in the middle of the left-side end among a symbol image representing ' ㅋ ' may be substituted with a short-width segment, and/or the symbol image located at the vertex may be substituted with a diagonal line.

In addition, as illustrated in FIG. 6L, rectangle symbols in the right-side end representing ' ㅌ ' may be substituted with long-width segments or lines, or an additional segment or lines connecting the two generated width segments may be generated.

In addition, as shown in FIG. 6F, a rectangle symbol among a symbol image representing ' ㅂ ' may be substituted with a short-width segment, or the rectangle symbol may be substituted with a height segment.

With reference to FIG. 1, as an exemplary embodiment, the generation unit 121 may generate symbol images at the position corresponding to a blank position in a character image that corresponds a character of, for example, but not limited to, the Korean alphabet inputted through the input unit 110. For example, the generation unit 121 may divide a rectangular image frame into an initial consonant area and a middle vowel area as illustrated in FIGS. 7A, 7B and 7C (a so called space division), and may generate symbol images corresponding to an initial consonant and a middle vowel independently to an initial consonant image frame and a middle vowel image frame, or may divide a rectangular image frame into an initial consonant area, a middle vowel area, and a final consonant area as illustrated in FIGS. 7D to 7F (space division) and may generate symbol images corresponding to an initial consonant, a middle vowel, and a final consonant independently to an initial consonant image frame, a middle vowel image frame, and a final consonant image frame, and output the symbol images through the output unit 140 by displaying them on the screen or printing them out.

In addition, the generation unit 121 may extract a symbol image mapped to a character inputted by a user and stored in the storage unit 130, and may divide a rectangular image frame into an initial consonant area and a middle vowel area as illustrated in FIGS. 7A, 7B and 7C (a so-called space division) and generate symbol images corresponding to an initial consonant and a middle vowel independently to an initial consonant image frame and a middle vowel image frame, or may divide a rectangular image frame into an initial consonant area, a middle vowel area, and a final consonant area as illustrated in FIGS. 7D to 7F (space division) and generate symbol images corresponding to an initial consonant, a middle vowel, and a final consonant independently to an initial consonant image frame, a middle vowel image frame, and a final consonant image frame, and output the symbol images through the output unit 140 by displaying them on the screen or printing them out.

In accordance with another embodiment, a user may input characters through the input unit 110 to be outputted as a symbol image (display or print output, etc.). After one of frames shown in FIGS. 7A, 7B and 7C is selected for a character combined with an initial consonant and a middle vowel of the Korean alphabet, or one of frames shown in FIGS. 7D, 7E and 7F is selected for a character combined with an initial consonant, a middle vowel, and a final consonant of the Korean alphabet, a portion in which a symbolic icon is to be placed is designated. For instance, a step capable of selecting a shape (e.g., a dot, a line, a face, etc.) of the symbolic icon may be provided, and when the user selects "the dot", a step capable of selecting a shape of dot (e.g., a triangle, a rectangle, a circle, etc.) may further provided. As such, when the symbolic icon is placed on a part of the space divided as a space division in certain divided space (for example, a rectangular image frame), the generation unit 121 may analyze the symbol image inputted through the input unit 110, and extract a character mapped to the symbol image inputted by the user and stored in the storage unit 130 and output the character of the relevant language through the output unit 140 in real time.

As such, the user may input character information of the language wanted to be outputted (or to be displayed or printed out, etc.) as a symbol image through the input unit 110. Alternatively, the user may input a symbol image wanted to be outputted as a character of the language (display or print output, etc.).

Meanwhile, in a numeral input mode, Arabic numerals may be represented by 10 numbers. That is, Arabic numerals are consist of '0', '1', '2', '3', '4', '6', '7', '8', and '9'.

The symbol image about Arabic numerals may be expressed by placing symbolic icons to a part of a certain divided space (for example, rectangular image frame). However, to the step for classifying the divided space (space division) may not be needed since Arabic numerals are not divided into an initial consonant, a middle vowel, and/or a final consonant. Herein, symbol icons may be formed by putting Arabic numerals in a predetermined frame and then by simplifying the identified shape from the empty space into dot, line and face. The dot may have a variety of shapes including, for example, but not limited to, triangle, rectangle, circle, etc.

Figure 8A:
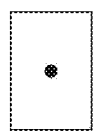
FIGS. 8A to 8J are diagrams illustrating a principle to generate a symbol image corresponding to Arabic numerals in accordance with an embodiment of the present invention.
Figure 8B:
Figure 8C:
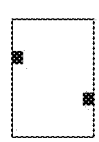
Figure 8D:
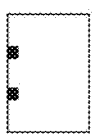
Figure 8E:
Figure 8F:
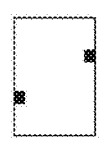
Figure 8G:
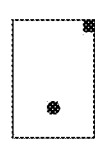
Figure 8H:
Figure 8I:
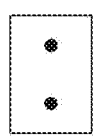
Figure 8J:
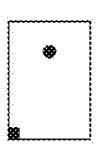
Figure 9:
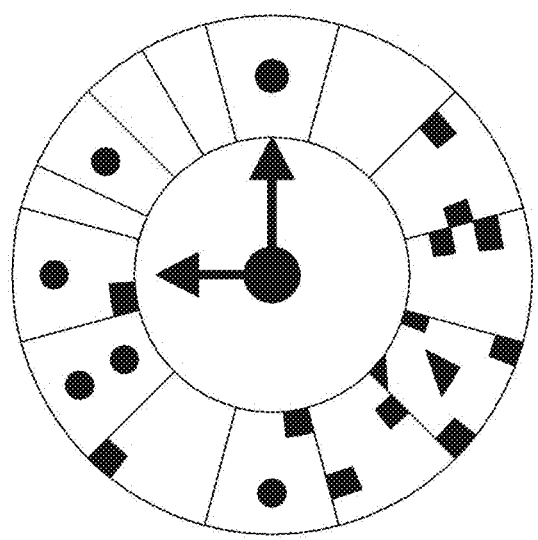
FIG. 9 is a diagram illustrating a clock design that utilizes numerals expressed by space division and symbolic icon in accordance with an embodiment of the present invention.

FIGS. 8A to 8J are exemplary embodiments illustrating a principle to generate a symbol image corresponding to Arabic numerals in numeral image frame. FIG. 8A is a symbol image corresponding to numeral '0', FIG. 8B is a symbol image corresponding to numeral '1', FIG. 8C is a symbol image corresponding to numeral '2', FIG. 8D is a symbol image corresponding to numeral '3', FIG. 8E is a symbol image corresponding to numeral '4', FIG. 8F is a symbol image corresponding to numeral '5', FIG. 8G is a symbol image corresponding to numeral '6', FIG. 8H is a symbol image corresponding to numeral '7', FIG. 8I is a symbol image corresponding to numeral '8', and FIG. 8J is a symbol image corresponding to numeral '9'. For example, the symbol images corresponding to numerals as described above may be represented as numerals by the space division and the symbolic icon by applying the symbol images to a clock as shown in FIG. 9.

Meanwhile, in an English word input mode, the English alphabet can be expressed by 52 letters in total, 26 of capital letters and 26 of small letters. 21 letters among 26 capital letters (or small letters) of the English alphabet, except for 5 vowels (that is, "A(a)", "E(e)", "I(i)", "O(o)" and "U(u)") are referred to as "consonant Alphabet". That is, English capital letters (/small letters) consist of 21 consonant alphabets (that is, 'B(b)', 'C(c)', 'D(d)', 'F(f)', 'G(g)', 'H(h)', 'J(j)', 'K(k)', 'L(l)', 'M(m)', 'N(n)', 'P(p)', 'Q(q)', 'R(r)', 'S(s)', 'T(t)', 'V(v)', 'W(w)', 'X(x)', 'Y(y)' and 'Z(z)', and 5 vowel alphabets (that is, 'A(a)', 'E(e)', 'I(i)', 'O(o)' and 'U(u)'.

Figures 10Q, 10R, 10S, 10T:
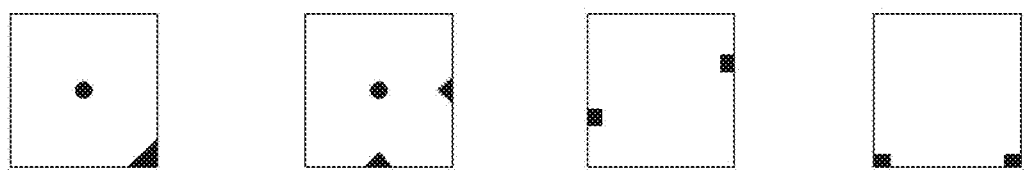
FIGS. 10A to 10Z are diagrams illustrating to generate a symbol image corresponding to English capital letters in accordance with an embodiment of the present invention.
Figures 10U, 10V, 10W, 10X:
Figures 10Y, 10Z:
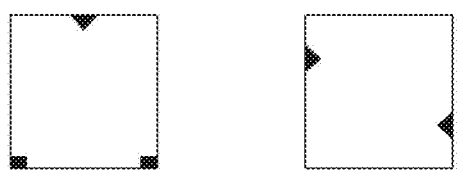
Figures 11A, 11B, 11C, 11D:
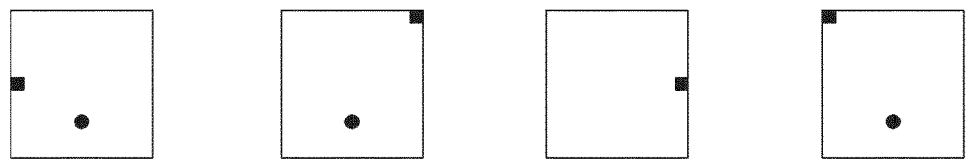
FIGS. 11A to 11Z are diagrams illustrating to generate a symbol image corresponding to English small letters in accordance with an embodiment of the present invention.
Figures 11E, 11F, 11G, 11H:
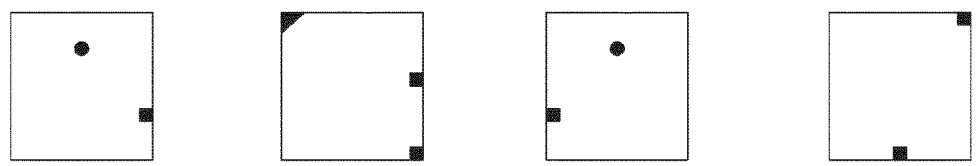
Figures 11I, 11J, 11K, 11L:
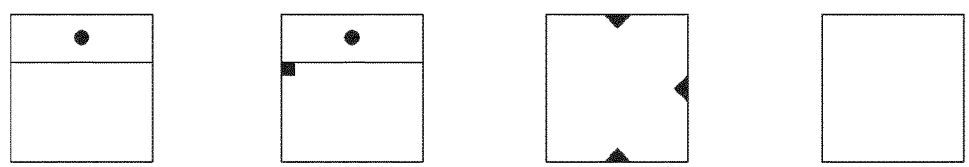
Figures 11M, 11N, 11O, 11P:
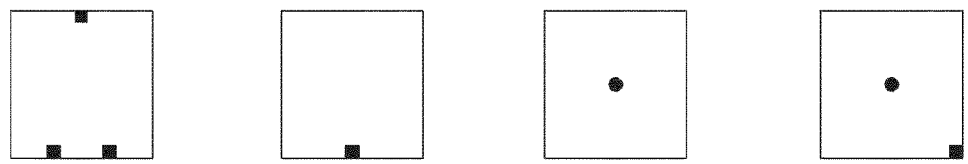

FIGS. 10A to 10Z show exemplary embodiments for generating symbol images corresponding to English capital letters in English image frames, and FIGS. 11A to 11Z shows exemplary embodiments for generating symbol images corresponding to English small letters in English image frames. FIGS. 10A to 10Z and FIGS. 11A to 11Z illustrate symbol images corresponding to English capital letters and small letters, "A" (or "a") to "Z" (or "z"), respectively.

Figure 48:
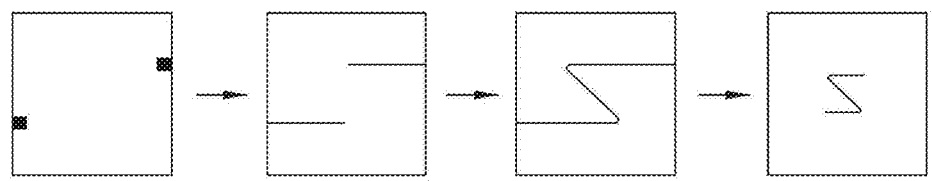
FIG. 48 is a diagram illustrating an application transformed example of symbol image of English characters in accordance with an embodiment of the present invention.

Meanwhile, as illustrated in FIG. 48, a symbol image of English letter S may have a variety of application transformed examples.

As such, while the symbol image may be generated in the capital letters and small letters of the English alphabet in the same manner, symbol images of the English alphabet may be expressed by placing symbolic icons in a portion of space in a predetermined divided space (for example, rectangular image frame). However, classifying the divided space (space division) except for capital 'Q', small letter ' ', 'j' and 'u' may not be needed since the English alphabet is not divided into a initial consonant, a middle vowel, and a final consonant. Herein, symbol icons are formed by putting English alphabets in a predetermined frame and then simplifying the identified shape from the empty space into dot, line and face. The dot may have a variety of shapes including, for instance, but not limited to, triangle, rectangle, circle, etc.

Accordingly, symbol images of English alphabets or numerals outputted through the output 140 may be expressed as divided spaces desirably to express at least one English character or numeral, and a symbol being at least one among triangle, rectangle, circle and straight line, which are placed in the space and may symbolically express the English alphabet or numerals. For example, each space may be separately placed in the transversal direction or longitudinal direction. And, symbolic icons may be at least one of the objects having a shape of triangle, rectangle, circle and polygon, and characters that remind of a polygon, an image or other symbolic icons.

Since the method for inputting numerals or the English characters, analyzing and outputting symbol images for them is the same as the method for inputting the characters, and analyzing and outputting symbol images for them, detailed description is omitted.

Space division, for example, may mean dividing a space to separate spaces for an initial consonant, a middle vowel, and a final consonant of the Korean alphabet, which may be embodied as shown in FIGS. 7A to 7F. For example, with regard to a symbol image corresponding to a character of the Korean alphabet that the initial consonant and the middle vowel are combined, the space may be separated into spaces or frames the initial consonant and the middle vowel such as FIGS. 7A to 7C, and the symbol image corresponding to the initial consonant and the middle vowel is represented. In addition, with regard to a symbol image corresponding to a character of the Korean alphabet that the initial consonant, the middle vowel and the final consonant are combined, the space may be separated into spaces or frames for the initial consonant, the middle vowel, and the final consonant such as FIGS. 7D to 7F, and the symbol image corresponding to the initial consonant, the middle vowel, and the final consonant is represented.

In this example, a ratio of space division for separating an initial consonant, a middle vowel, and a final consonant may freely be transformed, and a shape of outside also may freely be transformed. For example, a rim thickness of the rectangular image frame may be adjusted and a segment expression way may be partly changed to a dotted line. In FIGS. 12A and 12B, symbol images that means '단' and '청' are represented, respectively. In an exemplary embodiment of the present disclosure, for the simplicity of explanation, a ratio of the space division and a size of the symbolic icon are defined as a stereotyped shape. When dividing the space, not only a shape of looped curve may be used, but also a method capable of recognizing a separation of the space such as a difference of a dot, a line, a face, a color, a size, a position, a shape, a density, a configuration or a brightness contrast, a preference, a quality of the material, a texture (strictly a sense of sight), a light and shade, a pattern, etc. may be used. FIGS. 12A and 12B are diagrams illustrating examples of the Korean alphabet edited according to an embodiment of the present disclosure, and illustrate exemplary embodiments that are not the closed curve.

For example, at least one or more of dots, lines and faces may be used in the space division.

Figure 14:
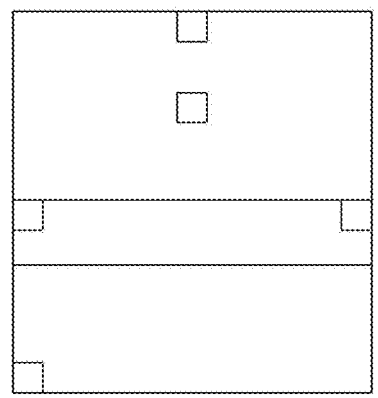
FIG. 14 is a diagram illustrating a use of lines in a space division in accordance with an embodiment of the present invention.
Figure 15:
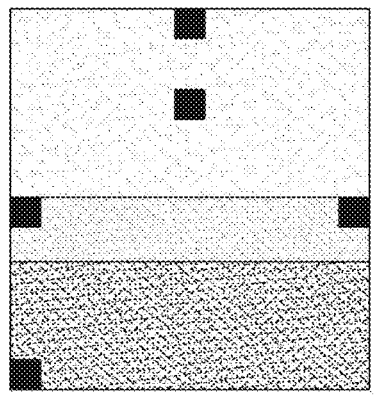
FIG. 15 and FIG. 16 are a diagram illustrating a use of faces in a space division in accordance with an embodiment of the present invention.
Figure 16:
Figure 17:
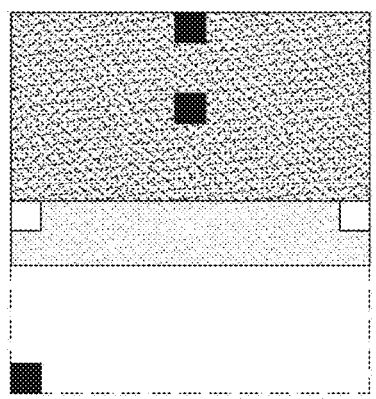
FIG. 17 is a diagram illustrating a combinational use of dots, lines, and faces in a space division in accordance with an embodiment of the present invention.

For example, to generate the Korean alphabet symbol image corresponding to the Korean character '복' in FIGS. 13 to 16, FIG. 13 illustrates an example of space division by dots; FIG. 14 illustrates an example of space division by lines; FIGS. 15 and 16 illustrate examples of space division by faces; and FIG. 17 illustrates an example of space division by combination of dots, lines and faces. For example, when dots and lines are simultaneously used as illustrated in FIG. 17, it would be convenient to express a final consonant of a character or a small letter.

In addition, space or space division for a symbol image may be freely reconstructed. When expressing characters of "대한민국" as described in FIGS. 18A to 18D, it is possible to take a variety of transformations such as space (FIG. 18A) in which each character is arranged independently, space (FIGS. 18B and 18C) in which neighboring characters share borders together, and space (FIG. 18D) in which an initial consonant, a middle vowel and a final consonant are arranged separately and expressed independently.

Figure 19:
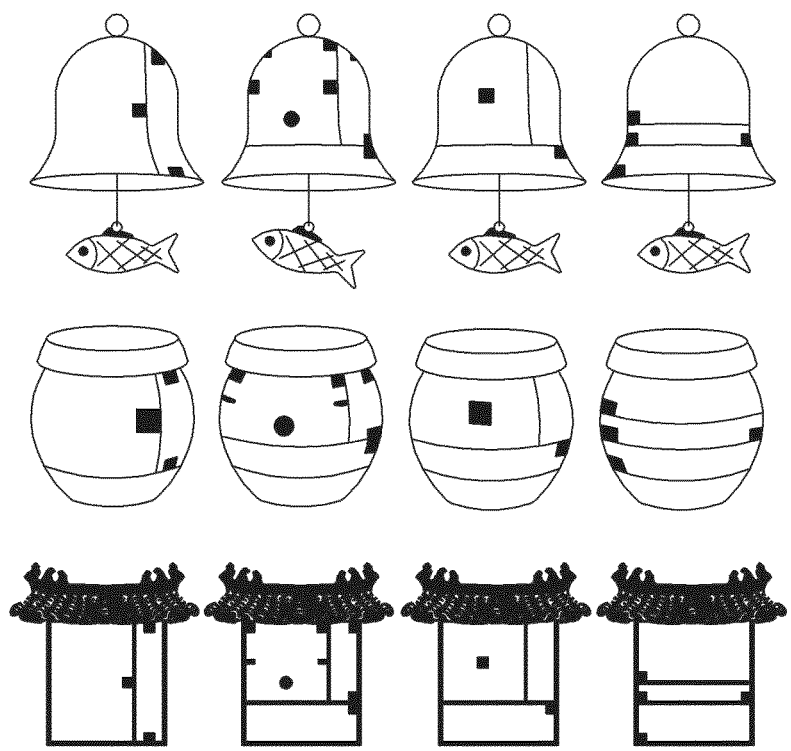
Figure 20:
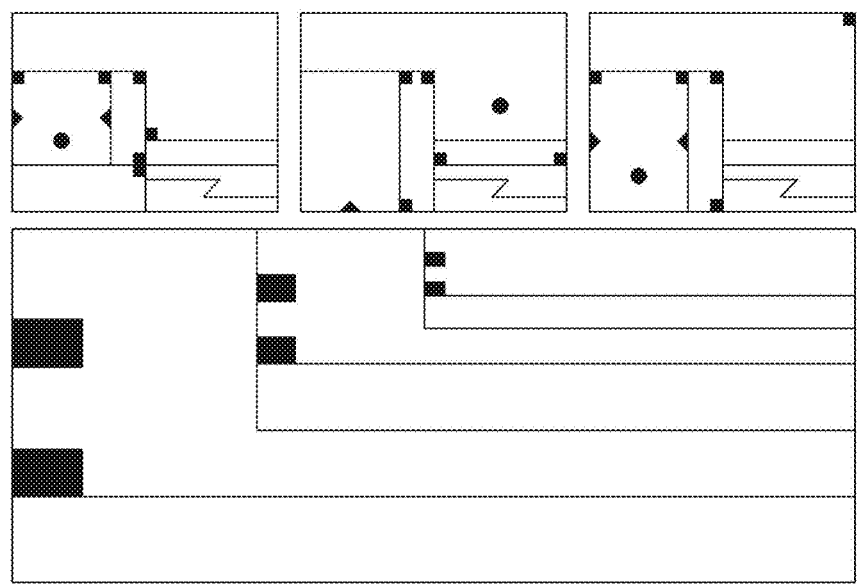
Figure 21:
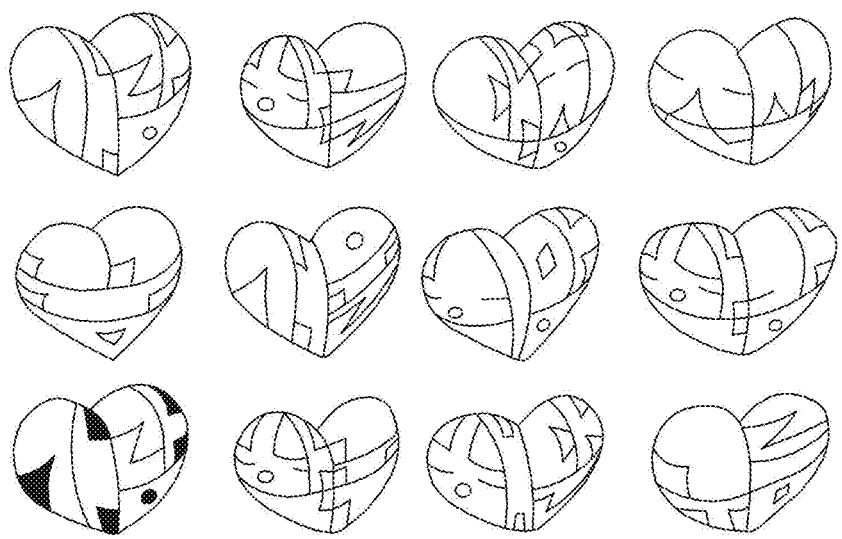
Figure 22:
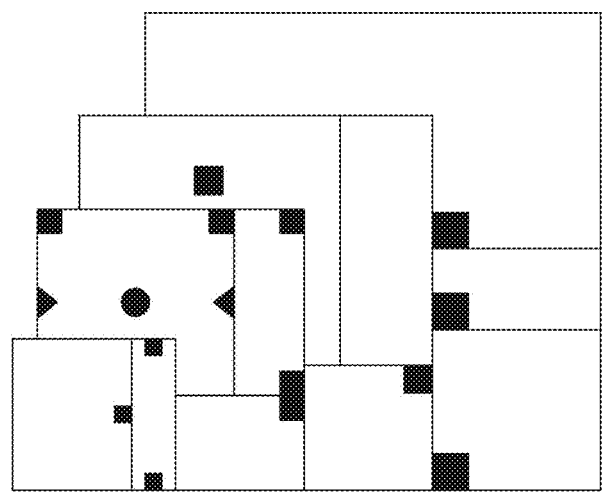

In a space of the rectangular image frame, the space may be divided (space division) and at least one or more symbolic icons may be placed in a portion of the space that is divided by the space division, and the peripheral formation of the image frame and the peripheral formation of the space division may be freely reconstructed as illustrated in FIGS. 19 to 22. In addition, FIG. 19 is a diagram illustrating outside of a space divided by space division with a windbell, a crock and a Koran-style house. Further, FIG. 20 is a diagram illustrating free deformation of space construction in the space division, and FIG. 21 is a diagram illustrating free deformation of the outside of space division. Further, FIG. 22 is a diagram illustrating application in which the outside of the space division is deformed and overlapped when applied to city buildings.

Figure 23:
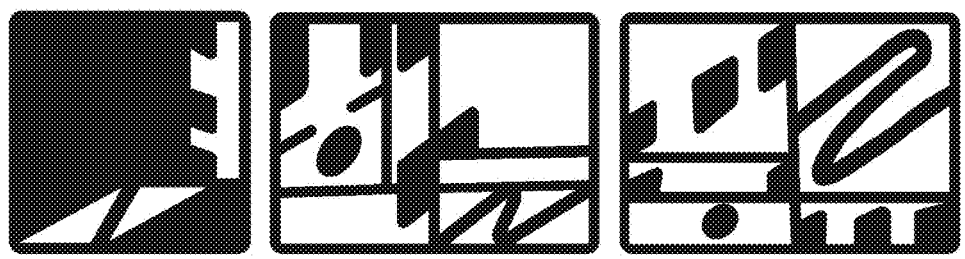
FIG. 23 is a diagram illustrating exaggeration and positional change of symbolic icons in accordance with an embodiment of the present invention.

Further, a symbolic icon that is placed in a space classified by the space division may be recognized by a positional change and an exaggeration (jump). For example, it is possible to recognize characters by changing the position of the symbolic icon and/or exaggerating it as illustrated in FIG. 23. Further, the same effect may be obtained by the idea and logic as well as a formulaic figure symbolic icon.

That is, FIG. 24 defines coordinates in which a symbolic icon can be placed. Therefore, consonant and vowel of the Korean alphabet character can be defined by the coordinate, and a concept of using a position coordinate in the Korean alphabet character may be applied to the English alphabet, numerals, and other characters.

Figure 25:
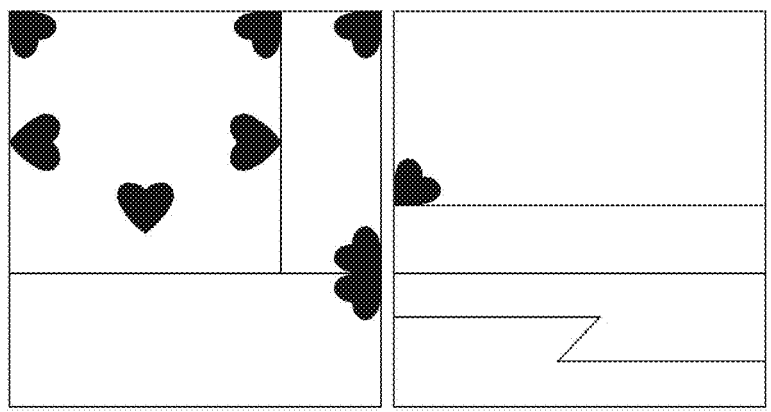
FIG. 25 is a diagram illustrating an example that the same symbolic icons are used for initial consonants, middle vowel, and final consonants in accordance with an embodiment of the present invention.

For example, 'ㄱ' can be defined in that a symbol is placed at the left-bottom vertext. Further, 'ㅏ' may be defined in that a symbol is placed at the right-upper and right-bottom vertextes. As such, all the consonants and vowels of the Korean alphabet may be defined only by their coordinates, and the same or substantially similar method or concept may be applied to the English characters, numerals or other characters. With the concept of the positional coordinate of a symbol, it is possible to recognize characters even when symbols placed in the initial consonant, middle vowel and final consonant are the same, as illustrated in FIG. 25. As such, the symbol itself may be replaced by the coordinate, and figure symbols such as rectangle, circle and triangle may be substituted with other symbols to express characters.

Meanwhile, FIG. 26 is diagrams illustrating that symbols, figure-shaped objects, and characters may be used as symbolic icons in accordance with an embodiment of the present disclosure. The left diagram of FIG. 26 illustrates an example in which the initial consonant, middle vowel and final consonant of the Korean alphabet are converted into symbols, the middle diagram of FIG. 26 illustrates an example in which the symbols are converted into objects that remind of the symbols, and the right diagram of FIG. 26 illustrates an example in which the symbols are converted into characters that remind of the objects. That is, since a pizza box reminds of a rectangle, a pizza reminds of a circle, and a piece of pizza reminds of a lozenge, as illustrated in a right diagram of FIG. 26, it may be possible to recognize the Korean alphabet by logical inference even when they are expressed in characters.

Besides, a space separated by the space division may transform a symbol image that means '용' (a dragon in English) to widely extend a middle vowel image frame in longitudinal direction as shown in FIG. 27A, and the space division may provide a space to insert a picture of dragon into a blank of the center as shown in FIG. 27B. FIG. 27A is a diagram illustrating a combination of the Korean alphabet character '용' and a dragon picture, a space between an initial consonant and a final consonant is separated by inserting a dragon picture in the space of 'ㅛ' corresponding to a middle vowel, the initial consonant and the final consonant represent 'ㅇ' as a circle shape and the middle vowel is represented by stamping seals having a rectangular shape.

When a concept of using dot, line and face is applied, a method applicable to express characters becomes diverse, and it becomes possible to express characters using natural geographical features such as roads, street trees, lakes, rivers, dams, bridges, buildings and artificial structures. Further, it becomes possible to express characters even using kinds of trees, texture difference (for instance, sight) obtained by dividing rice paddy and dry field, color changes in autumn leaves, light and shade by the positional change of the sun.

Figure 28:
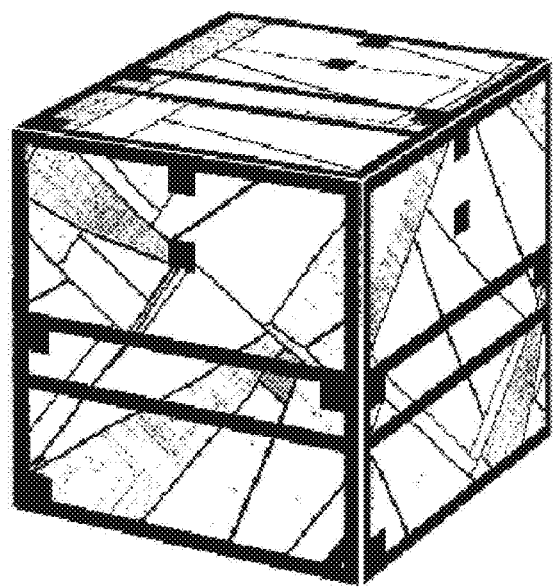
FIG. 28 is a diagram illustrating an example that space division and stained glass are used as a symbolic icon using a building in accordance with an embodiment of the present invention.

Further, the space division and the placement of symbolic icons can be expressed even by the differences of the simple texture (for example, sight or tactile impression) and the color sense. That is, division of space can also be recognized not only by a solid line, but also by difference of texture. For example, the initial consonant space may be filled with asphalt, the middle vowel space may be filled with red clay, and the final consonant space may be filled with sand. Three spaces can be recognized separately by the color, density or configuration, or texture (strictly, sight) of the filled substances. Likewise, the space division and placement of the symbol can be expressed by such substances. FIG. 28 is an exemplary embodiment expressing the Korean alphabet characters using stained glass on the surfaces of the building.

Figure 29:
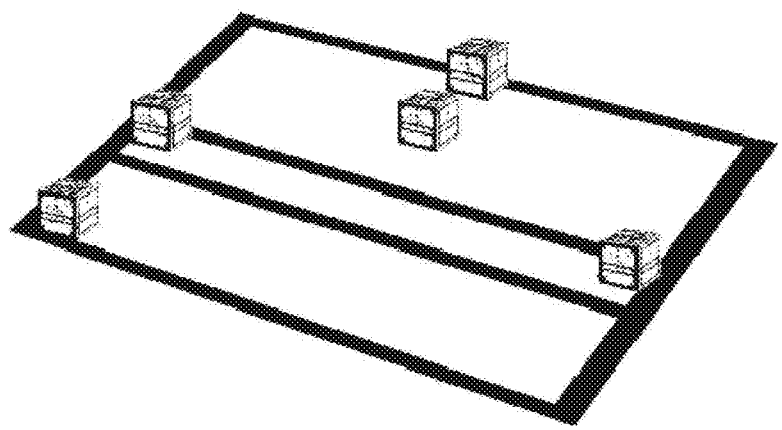
FIG. 29 is a diagram illustrating a space division using roads and a symbolic icon using a building, in accordance with an embodiment of the present invention.
Figure 30:
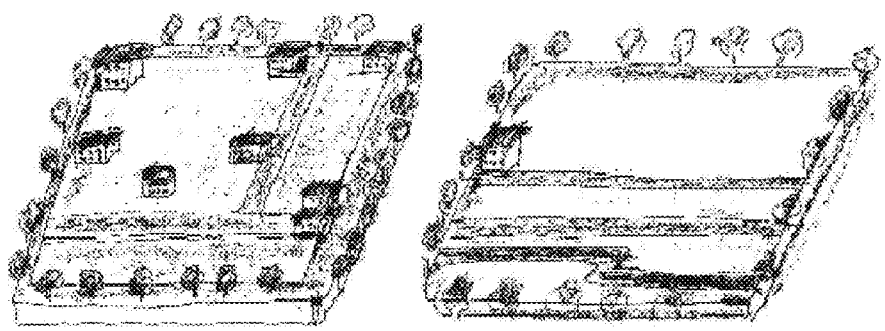
FIG. 30 is a diagram illustrating a space division using geographic features such as road, river, tree, forest, and park, etc. in accordance with an embodiment of the present invention.

Further, the space division and placement of the symbol may also be expressed by geographical features such as a road, rice paddy and dry field, lake, river and forest. Accordingly, it is possible to express characters by utilizing the geographical features in city planning. FIG. 29 is an exemplary embodiment expressing the Korean alphabet character '복' using roads and buildings, and FIG. 30 is an exemplary embodiments representing the Korean alphabet characters '한글' by the space division and placement of symbol using geographical features such as a road, river, tree, forest and park.

Meanwhile, it is possible to express space division in that each space is different from one another and symbols are placed to be overlapped. That is, it is possible to accomplish placement of a complicated symbol and space division by overlapping 2 symbolic images (layers 1 and 2) as illustrated in FIGS. 31A to 31D.

Before overlapping the characters, each character may be marked with a different symbol in order to make it identified easily. In this case, the differentiation may be achieved by making the shapes of the symbols different or by using characters and signs. For example, there is a method which is to differentiate by colors.

As in the first image of FIG. 31A, the character '축' is colored in black, and as in the second image of FIG. 31A, the character '복' is divided in gray, and then the third image of FIG. 31A may be generated by overlapping these two symbol images. In this case, the final consonants of '축' and '복' are the same character 'ㄱ'. If the shapes and sizes of the figures are same, the figure (final consonant image) of the second symbol image (layer 2) be covered by the figure of the first symbol image (layer 1). When it happens, overlapping state is clearly identified either by reducing the size of the figure (final consonant) of the first symbol image (layer 1) (FIG. 31B) or by enlarging the size of the second symbol image (layer 2) (FIG. 31C). That is, the overlapping state becomes clear by making the figure sizes of the two symbol images different from each other. Further, if the figure of the second symbol image is covered by the figure of the first symbol image and it can be easily inferred, the figure expression of the second symbol image may be omitted (FIG. 31D).

Unique characteristics are given to the two overlapped symbol images (layers 1 and 2) to differentiate and these characteristics make each layer recognizable as an independent character. In accordance with an embodiment, characteristics given to the layer can include not only color, size, position, density, configuration, texture (such as sight), brightness, chroma, shape, light and shade and pattern but also two- and three-dimensional space division.

Figures 32A, 32B, 32C:
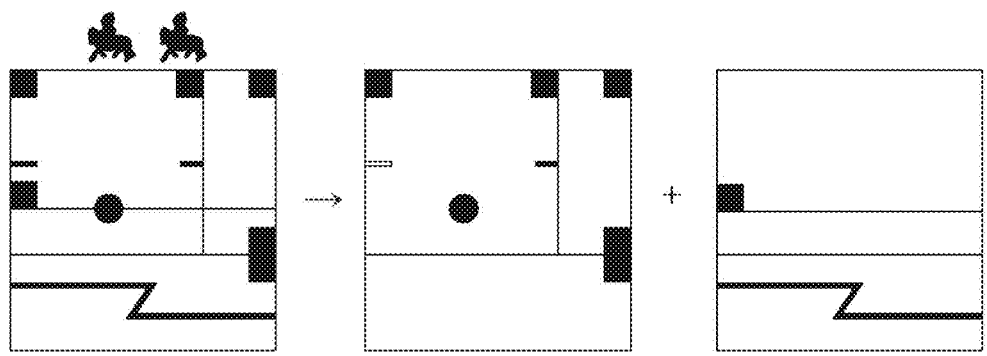
FIGS. 32A to 32C are diagrams illustrating an example to readout overlapped characters.

For example, as shown in FIGS. 32A to 32C, the order of overlapped layers may be indicated by signs (or identifiers) which have the same characteristics of each layer. The object of identifiers may be to display the order and decoration, and thus it may be displayed in the same number as it of the layers or not, and the order of the layers may be recognized by the identifier and the number of layers may be recognized by the number of symbol kinds in the overlapped symbol characters. The order of the identifiers may be determined vertically from 'top' to 'bottom' or horizontally from 'left' to 'right' depending on the reading method of the characters. Accordingly, the identifier placed on the uppermost and left side may indicate the first layer.

For example, an identifier (black identifier) that is identical to at least one of the color, size, position, density, configuration, light and shade, brightness, pattern and texture of the first symbol image (layer 1) generated earlier is displayed at the front as illustrated in the first image of FIG. 32A, and an identifier (gray identifier) that is identical to at least one of color, size, position, density, configuration, light and shade, brightness, pattern and texture of the second symbol image (layer 2) generated later is displayed at the back as illustrated in the first image of FIG. 32A. In the two symbol images (layers 1 and 2) that are overlapped as in the first image of FIG. 32A, '한' is decoded first as in the second image of FIG. 32B and '글' is decoded later as in the third image of FIG. 32C. As a result, the overlapped first image of FIG. 32A can be decoded as '한글'.

Figure 33:
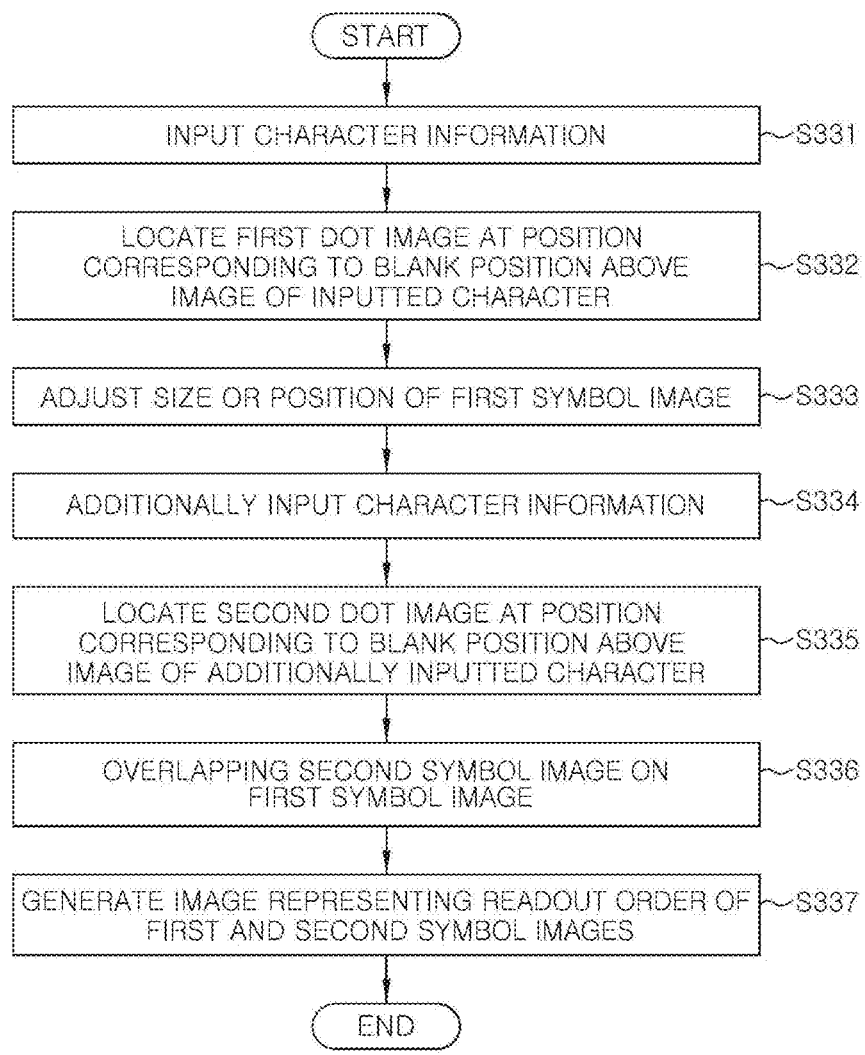
FIG. 33 is a diagram showing a symbol image editing method in accordance with an embodiment of the present invention.

FIG. 33 is a flow chart showing a symbol image editing method in accordance with an embodiment of the present disclosure.

According to the first embodiment described above, the symbol image editing apparatus 100 may convert characters of the language (such as Korean alphabet, English alphabet, etc.), numerals and symbols inputted through the input unit 110 into symbol images in accordance with the control of the controller 120, and may output the symbol images through the output unit 140 in real time. It will be described in detail in the following description.

An explanation for a procedure performing an input process in the symbol image editing apparatus 100 and an output process through other device of the outside, based on the second embodiment of the present disclosure, will be omitted. Further, an explanation for a procedure performing an input process through other device of the outside and an output process in the symbol image editing apparatus 100, based on the third embodiment of the present disclosure, will be omitted.

Firstly, a user may input a character or a numeral to be generated as a symbol image and edit the symbol image through the input unit 110 of the symbol image editing apparatus 100 (S331).

In response to the input, the generation unit 121 may generate a symbol/numeral image at the position corresponding to the blank position in a character/numeral image corresponding to a character/numeral inputted through the input unit 110 (S332). For example, a rectangular image frame may be divided into an initial consonant area and a middle vowel area as illustrated in FIGS. 7A, 7B and 7C (space division) and symbol images corresponding to an initial consonant and a middle vowel independently to an initial consonant image frame and a middle vowel image frame are generated in accordance with the above description in FIGS. 3A to 3S and 4A to 4U. Alternatively, a rectangular image frame may be divided into an initial consonant area, a middle vowel area, and a final consonant area as illustrated in FIGS. 7D to 7F (space division) and symbol images corresponding to an initial consonant, a middle vowel, and a final consonant independently to an initial consonant image frame, a middle vowel image frame, and a final consonant image frame may be generated in accordance with the above description in FIGS. 3A to 3S and 5A to 5K. Meanwhile, the generation unit 121 may generate the symbol image in accordance with a transformed shape of the symbol image of the above description in FIGS. 6A-6P. Alternatively, a numeral image corresponding to a numeral in the rectangular image frame may be generated in accordance with the above described exemplary embodiments in FIGS. 8A to 8J. Alternatively or additionally, an English alphabet image corresponding to a capital or a small letter of the English alphabet in the rectangular image frame may be generated in accordance with the above described method in FIGS. 10A to 10Z or FIGS. 11A to 11Z.

Symbol images corresponding to characters inputted by the user may be stored in the storage unit 130. The generation unit 121 may extract the symbol image mapped to the relevant character in real time. For example, the generation unit 121 may extract the symbol image mapped to the character inputted by the user and stored in the storage unit 130, and may divide a rectangular image frame into an initial consonant area and a middle vowel area (space division), as illustrated in FIGS. 7A, 7B and 7C, and configure symbol images corresponding to an initial consonant and a middle vowel independently to an initial consonant image frame and a middle vowel image frame. Alternatively, the generation unit 121 may divide a rectangular image frame into an initial consonant area, a middle vowel area, and a final consonant area (space division), as illustrated in FIGS. 7D to 7F, and may configure symbol images corresponding to an initial consonant, a middle vowel, and a final consonant independently to an initial consonant image frame, a middle vowel image frame, and a final consonant image frame.

Meanwhile, a user can freely edit the generated symbol image such as a shape, a color, a size or a position of the symbol image generated after generating the symbol image corresponding to the character or numeral by the symbol image editing apparatus 100 (S333). For instance, the user may: adjust a size or shape of the rectangular image frame in the symbol image through the input unit 110 if necessary; adjust an angle size or a relative ratio of an initial image frame, a middle image frame, and a final image frame configuring the rectangular image frame; adjust a size of each symbol configuring the symbol image; or input a command to change a thickness of the outer rim of each image frame and a segment expression method (such as a dotted line, a solid line, etc.), and the editing unit 122 of the symbol image editing apparatus 100 may adjust a size or a position of the symbol image displayed on the screen of the output unit 140 (S133).

In addition, the user may input character or numeral information through the input unit 110 as needed (S334). The generation unit 121 of the symbol image editing apparatus 100 then may generate a symbol image for an additionally inputted character or numeral according to the step in operation described in S332 (S335).

In addition, the user may generate or issue an editing command to overlap the plurality of symbol images, for example, by overlapping one generated symbol image (a second symbol image) on another generated symbol image (a first symbol image). In response to the editing command, the editing unit 122 of the symbol image editing apparatus 100 may edit to overlap the second symbol image on the first symbol image as shown in FIGS. 31A to 31D (S336). During the step S336, as shown in FIGS. 32A to 32C, an image (an identifier) showing an order of readout for two overlapped symbol images may be represented along with the overlapped symbol images as shown in FIGS. 32A to 32C (S337).

Meanwhile, even though it is not shown in the figures, the symbol image editing apparatus 100 may analyze the symbol image inputted through the input unit 110 by the controller 120 and then output the character (including numeral) of the relevant language through the output unit 140 in real time.

For this, the user may input a symbol image wanted to be outputted as a character of the language (display or print output, frequency output, etc.) through the input unit 110. For example, after one of FIGS. 7A, 7B and 7C is selected for a character combined of an initial consonant and a middle vowel of the Korean alphabet character, or one of FIGS. 7D, 7E and 7F is selected for a character combined of an initial consonant, a middle vowel, and a final consonant of the Korean alphabet character, a portion in which a symbolic icon is to be placed may be designated. Subsequently, the method may provide an operation in that a user can select a shape (a dot, a line, a face, etc.) of the symbolic icon. For example, when the user selects "the dot", the method can provide an operation in that a user can select a shape of dot (e.g., a triangle, a rectangle, a circle, etc.). Accordingly, the generation unit 121 may generate a character or numeral corresponding to a character or numeral image inputted through the input unit 110 and then may output it through the output unit 140 by displaying it on the screen or outputting to a printer or in a form of a frequency. For instance, the frequency output may be used to output the symbol image by generating waves on the surface of water.

The user may edit a symbol image inputted through the editing unit 122, or freely edit certain divided space (for example, a rectangular image frame) and space division that makes a separated space (for example, a space division to separate an initial consonant, a middle vowel, and a final consonant of the Korean alphabet).

Figure 35A:
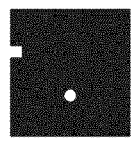
Figure 35B:
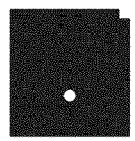
Figure 35C:
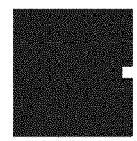
Figure 35D:
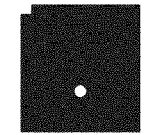
Figure 35E:
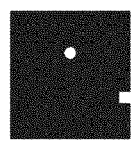
Figure 35F:
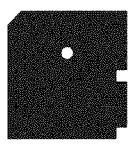
Figure 35G:
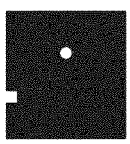
Figure 35H:
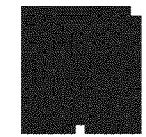
Figure 35I:
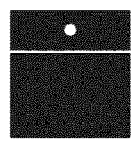
Figure 35J:
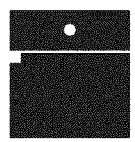
Figure 35K:
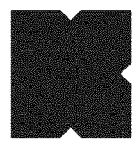
Figure 35L:
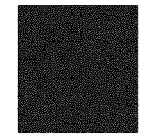
Figure 35M:
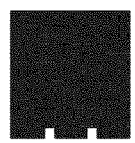
Figure 35N:
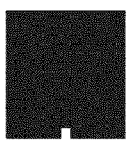
Figure 35O:
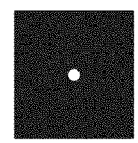
Figure 35P:
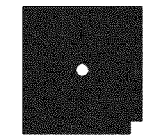
Figure 36:
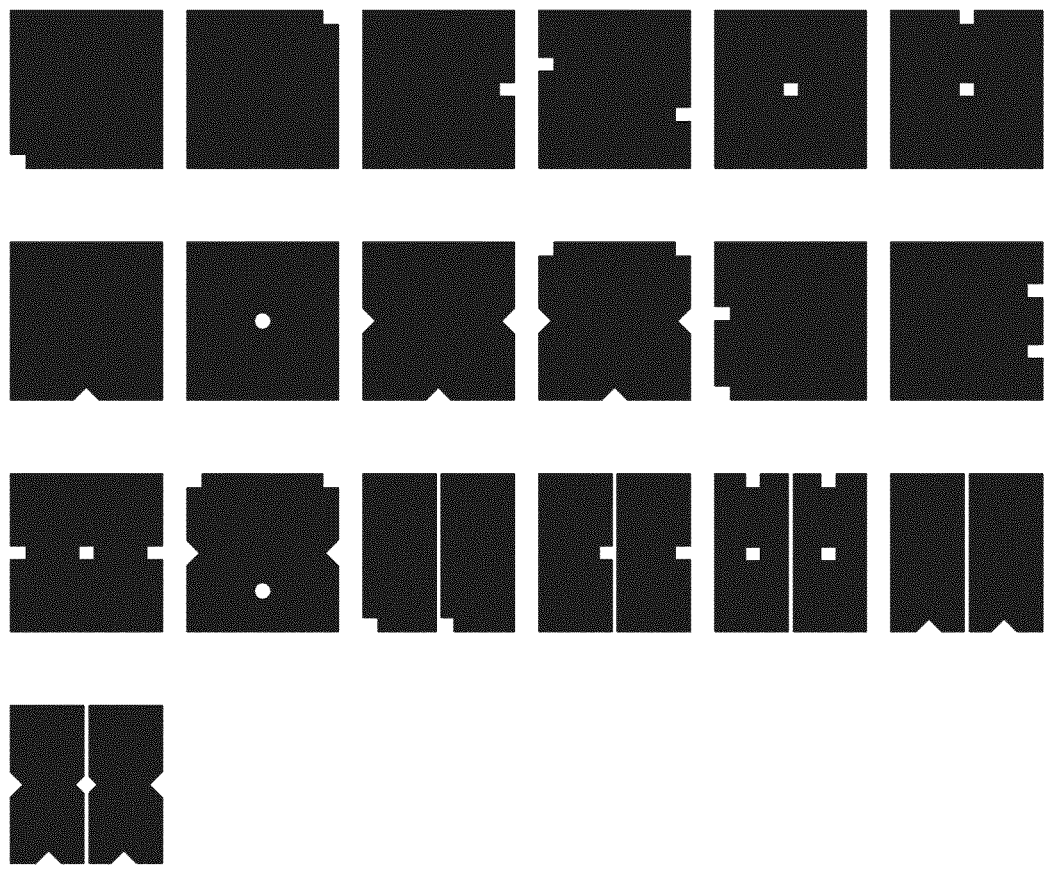
Figure 37:
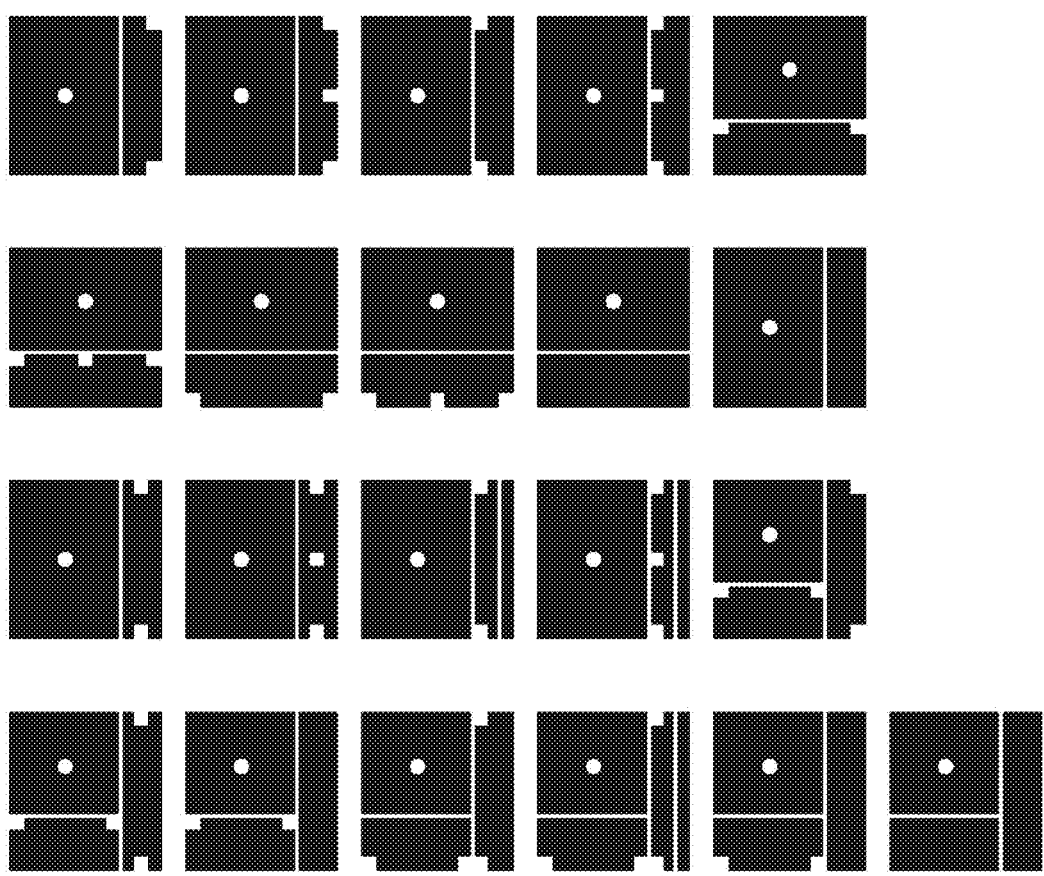
Figure 38:
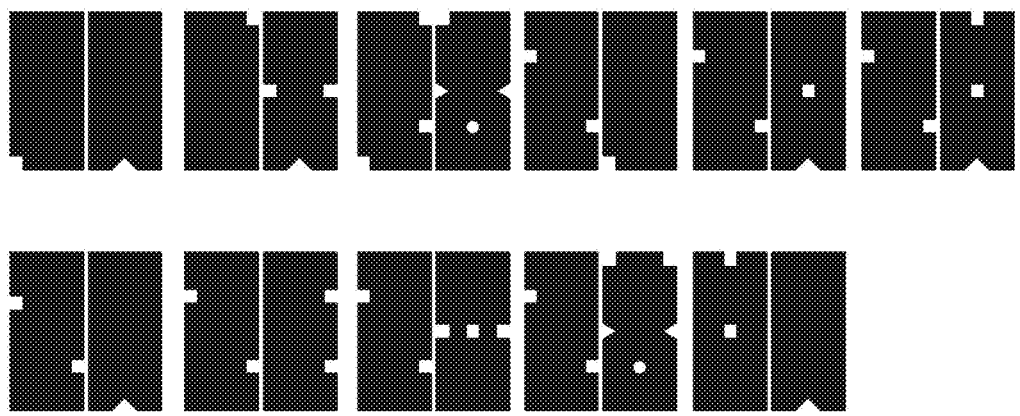

Meanwhile, in implementing an embodiment of the present disclosure, a symbol image to which a reversal image is applied may be configured. Accordingly, symbol images applying a reversal image to capital letters of the English alphabet may be configured as shown in FIGS. 34A to 34Z, symbol images applying a reversal image to small letters of the English alphabet may be configured as shown in FIGS. 35A to 35Z, symbol images applying a reversal image to initial consonants of the Korean alphabet may be configured as shown in FIG. 36, symbol images applying a reversal image to middle vowels of the Korean alphabet may be configured as shown in FIG. 37, and symbol images applying a reversal image to final consonants of the Korean alphabet may be configured as shown in FIG. 38.

Figure 39:
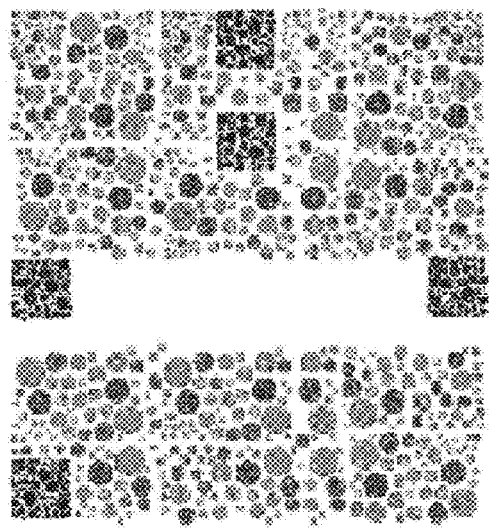
FIG. 39 is a diagram illustrating a symbol image represented by a density and a configuration.

Meanwhile, in implementing an embodiment of the present disclosure, as shown in FIG. 39, a symbol image may be configured with a density and/or a configuration. That is, a symbolic icon of the symbol character may be represented by a density and/or a configuration and also may be represented with a complex combination of a configuration, a density, a pattern, a size, a shape, a texture, a position, a brightness, etc.

For instance, in FIG. 39, the character '특' is represented by a configuration of a circle, and a rectangle shape that is densely configured, has a dark color and uses a relatively small size circles is used as a symbolic icon. That is, the symbolic icon does not need to have a shape of a rectangle, a triangle, and a circle. A symbol character may be represented by a density and a configuration having a totally different shape.

Figure 40:
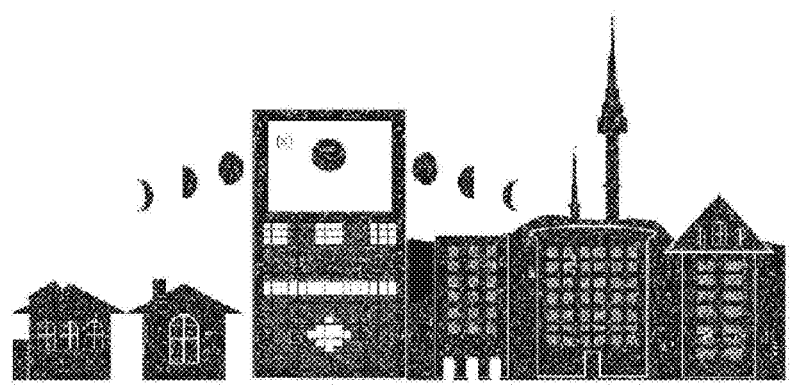
FIG. 40 is a diagram illustrating an application example implementing symbol images by using natural objects.

Besides, an embodiment of the present disclosure may be used to plan a city design that the character '용' may be embodied as a symbol image by using the moon as a part of the symbol image as shown in FIG. 40.

In addition, in accordance with an embodiment of the present disclosure, as shown in FIG. 41, an overlap expression (overlapping) (ONE) in the English characters may be embodied. A delimiter may be indicated over the top in a rectangular that the English characters "O", "N", and "E" are overwritten, and is commonly expressed by a black color not to overlap symbol images. In this case, the delimiter may not use a color as an order, but the delimiter may use a shape as an order.

Besides, in case where space division of the present disclosure is applied to English character, the English character may be divided into the space division of 3 shapes as shown in FIGS. 42A, 42B, and 42C.

For example, "Q" and "u" need space division as shown in FIG. 42B, "i" and "j" need space division as shown in FIG. 42C, and the rest of the English characters need space division as shown in FIG. 42A.

That is, "Q", "u", "i", and "j" among the English characters may need the space division. By using the space division, symbol images of "A", "Q", "u", "i", and "j" may be represented as shown in FIGS. 43A to 43C.

Figure 45:
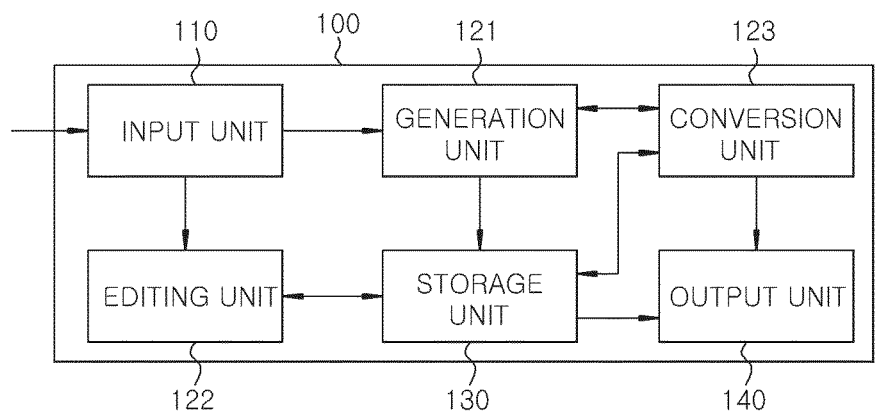
FIG. 45 is a functional block diagram explaining a character image editing apparatus in accordance with another embodiment of the present invention.

FIG. 45 is a block diagram for a character image editing apparatus in accordance with another embodiment of the present disclosure. With reference to FIG. 45, the character image editing apparatus 100 in accordance with another embodiment of the present disclosure may further include a conversion unit 123. The conversion unit 123 may be added to a configuration of the character image editing apparatus 100 shown in the embodiment of FIG. 1.

In this embodiment, the conversion unit 123 may convert specific character information into character information of a different language having the same meaning.

For this, the storage unit 130 may store character information of various languages (such as Korean, Chinese, Japanese, English, etc.) having the same meaning. The user may set a language to be inputted by oneself and a language to be converted as a first language and a second language through the input unit 110.

For example, in case where the user designates Korean as a first language and English as a second language, and the user inputs Korean character information through the input unit 110, the conversion unit 123 may searche English character information corresponding to information of the relevant Korean character stored in the storage unit 130, and convert the inputted Korean character information into the searched English character information.

Meanwhile, the converted English character information may be transmitted or delivered to the generation unit 121 and then a procedure for generating and/or editing an image may performed.

Further, in FIG. 45, the input unit 110, the generation unit 121, the storage unit 130, the editing unit 122, and the output unit 140 may be basically the same as the elements shown in FIG. 1.

Figure 46:
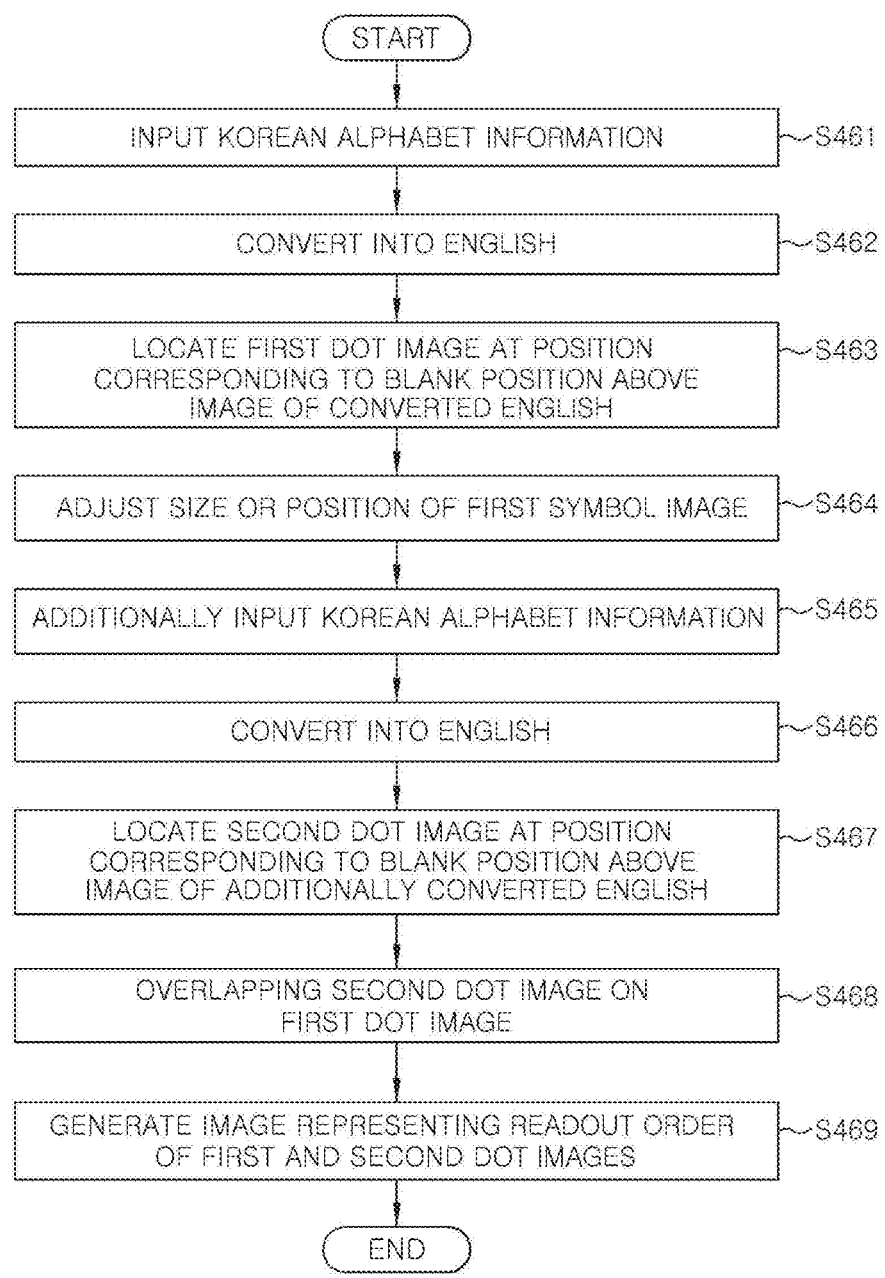
FIG. 46 is a flow chart of procedure explaining a principle of a character image editing method in accordance with another embodiment of the present invention.

FIG. 46 is a flow chart illustrating a character image editing method in accordance with another embodiment of the present disclosure. With reference to FIG. 46, a principle of the character image editing method in accordance with another embodiment of the present disclosure will be explained as follows. Firstly, the user may enter a first language to be inputted by using the Korean alphabet and enter and set a second language to be converted by using English alphabet through the input unit 110. And then the user may input information of the Korean alphabet as a letter that wants a dot image generation and edit through the input unit 110 of the character image editing apparatus 100 (S461).

Meanwhile, even though the first language is illustrated and explained as Korean and the second language is illustrated and explained as English, various languages may be used as the first and second languages.

Thereafter, the conversion unit 123 may searche English character information corresponding to the relevant Korean character information stored in the storage unit 130 (S462).

Accordingly, the generation unit 121 may generate a dot image at the position corresponding to a blank position in an image of the converted English word by the conversion unit 123 in accordance with the above described method in FIGS. 10 and 11 (S463), and the generated dot image may be stored in the storage unit 130.

As described above, according to the character image editing method in accordance with another embodiment of the present disclosure in FIG. 46, even though the user who is not familiar with a second language, but familiar a first language, the user can easily generate and edit the embodied symbol image of the second language having the same meaning as it of the first language.

Further, as described in FIG. 33, the user may edit a dot image generated after generating the dot image corresponding to English by using the character image editing apparatus 100 (S464).

Further, the user may input additional Korean alphabet information as a first language through the input unit 110 when needed (S465). In response to the inputted additionally Korean alphabet information, the conversion unit 123 may retrieve English character information corresponding to the additional Korean alphabet from the storage unit 130, and convert the additional Korean alphabet character information into the retrieved English character information (S466).

Additionally, the generation unit 121 of the character image editing apparatus 100 may generate one or more dot images for additionally converted English according to the step S463 as described above (S467), and the generated dot image may be stored in the storage unit 130.

Further, the user may edit to overlap the additionally generated dot image (second dot image) on the initially generated dot image (first dot image). In this case, the editor or editing unit 122 of the character image editing apparatus 100 may edit to overlap the second dot image on the first dot image (S468).

Meanwhile, as described above, since the overlapped second dot image may be separated from the first dot image, the editor 170 may edit at least one or more of color, position, light and shade, brightness, pattern, texture, and shape of the second dot image to be different from the first dot image. In the embodiment of the present disclosure, the user may input an editing instruction to make at least one or more of the color, position, light and shade, brightness, pattern, texture, and shape of the second dot image different from the first dot image through the input unit 110.

Further, the overlapped two dot images may be displayed on the image whose reading order has been edited. Accordingly, the editor 122 of the character image editing apparatus 100 may display the identifier that is same as at least one or more of color, position, light and shade, brightness, pattern, texture, and shape of the first dot image in front as shown in the first figure of FIG. 32A. And, by displaying the identifier that is same as at least one or more of color, position, light and shade, brightness, pattern, texture, and shape of the second dot image in the back as shown in the first figure FIG. 32A, it may help the third parties to read or recognize the character 'O' in the second image of FIG. 41 first through the edited dot image (ONE) which is the first image of FIG. 41 and to read 'N' in the third image of FIG. 41 and to read 'E' in the fourth image of FIG. 41 later. Therefore, it is desirable to read the edited dot image, which is the first image of FIG. 41, as 'ONE' (S469).

Figure 47:
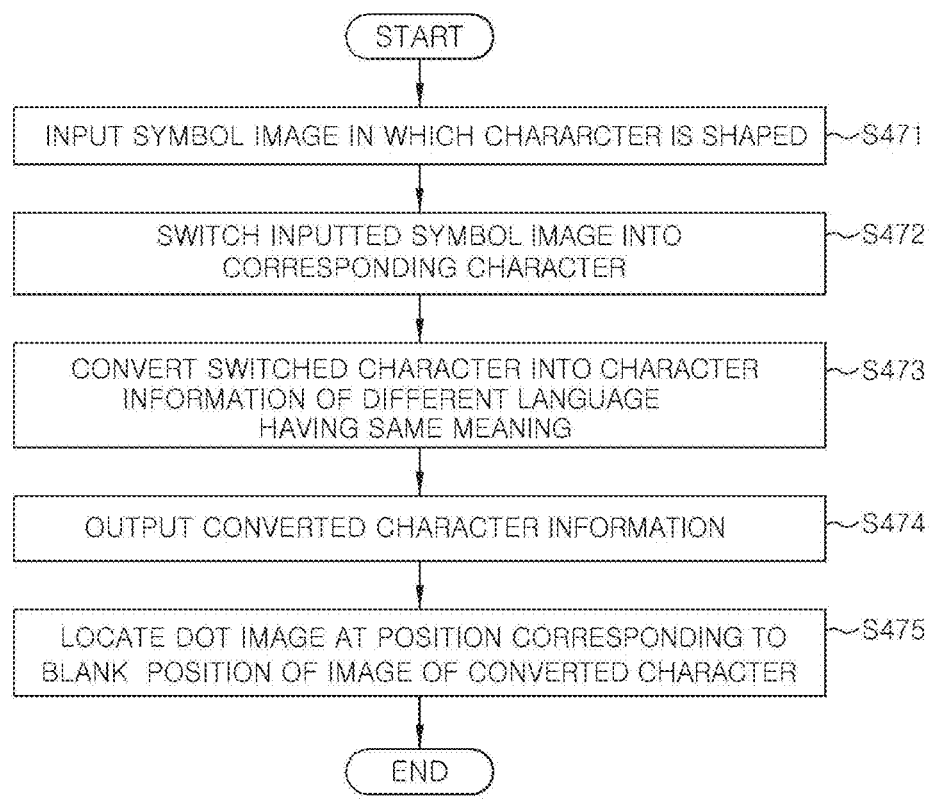
FIG. 47 is a flow chart explaining a principle of character image editing method in accordance with yet another embodiment of the present invention.

FIG. 47 is a flow chart illustrating a character image editing method in accordance with yet another embodiment of the present disclosure. The principle of character image editing method in accordance with yet another embodiment of the present disclosure will be described as follows. In the exemplary embodiment of the present invention, a symbol image may be inputted through the input unit 110, and the generation unit 121 may analyze the symbol image, and extract a character corresponding to the relevant symbol image. The conversion unit 123 then may covert the extracted character into a character of the language designated by the user, and the character converted by the conversion unit 123 may be outputted through the output unit 140 in real time.

As described above, the user may easily understand a meaning of a shaped symbol image of information of the character could not be understood by the user as a language used to oneself by the character image editing apparatus shown in FIG. 45.

Furthermore, the user may again generate a symbol image that character information converted into a language used to oneself is shaped.

Hereinafter, with reference to FIG. 47, a principle of a character image editing method in accordance with yet another embodiment of the present invention will be described.

Firstly, the user may predetermine a first language (for example, Korean) to be inputted to the conversion unit 123 and a second language (for example, English) to be converted and generated by the conversion unit 123 through the input unit 110.

Next, a shaped symbol image of a character may inputted into the input unit 110 of the character image editing apparatus (S471). The generation unit 121 then may analyze the relevant symbol image, and switch it into character information corresponding to the relevant symbol image for the extraction of it (S472).

Meanwhile, when the generation unit 121 analyzes an image and switches it to extract the corresponding character information, it is possible to switch and extract a character from a symbol image by inversely applying an operation generating the symbol image from each character as shown in FIG. 2.

Accordingly, the conversion unit 123 may search character information (for example, Korean character) of the first language switched and extracted by the generation unit 121 and character information (for example, English alphabet) of the second language corresponding to the character information stored in the storage unit 130. And then, the conversion unit 123 may convert the character information of the first language into the character information of the second language (S473).

Subsequently, the output unit 140 of the character image editing apparatus 100 may output the converted character information through the conversion unit 123 in real time (S474).

Further, a dot image may be generated at a position corresponding to a blank position in an image of the English word converted by the conversion unit 123 of the character image editing apparatus 100 according to the embodiments shown in FIGS. 10 and 11 (S475), and then the generated dot image may be stored in the storage unit 130.

Even though the above method is described through a specific embodiments, the above method may also be embodied as a computer, smart device, and smart device-readable code on the computer, smart device, and smart device-readable medium. The smart device and the smart device-readable medium comprise all kinds of recording devices that the computer and smart device system-readable data is stored. The computer and smart device-readable recording medium includes, for example, ROM, RAM, CD-ROM, magnetic tape, floppy disk, optical data storage device, flash memory, USB, SD card, etc., and also includes an implementation of a shape of carrier wave (for example, transmission through an Internet). In addition, the computer and smart device system-readable recording medium is distributed in network-connected computers and the smart device systems. In the computer and smart device system-readable recording medium, therefore, the computer and smart device system-readable code may be stored and performed in distributed method. And, a functional program, a code and a code segment for implementing the above embodiments may easily be inferred by the programmers of technical field of the present invention.

As described above, the symbol image in the exemplary embodiments of the present disclosure (for example, a dot character) may be a symbolic character for combination and metaphor that may two-dimensionally promote a combination of a character and an image and three-dimensionally combines a subject and a character. Since it is not only easily read by a geometric configuration, but also easily combined with an object and a space, a message intended by a creator may metaphorically be included, and therefore, a value of the object and the space may be increased.

In addition, there are times of mass consumption and mass production and thus this consumption pattern emphasizes on a value of the product according to a price and brand name of the product. However, since it becomes easier to combine the product with a character by some embodiments of the present disclosure and thus it is possible to designate to goods a special purchasing meaning such as a birthday, a marriage, etc., whereby a user will find a new value besides a value and brand name through a meaning of a character combined with the product.

Some embodiments of the present disclosure may more interestingly be used in the fields of crafts, arts, architectures, interiors, fashions, lighting design, city planning. In addition, since it is possible to metaphorically express a character and becomes easier to express the character without damaging a gist of work, characters containing philosophy, intension, belief, wish, and preference meaning of an author may easily be combined and developed to the new creation genre.

Especially, since many buildings have a rectangular structure, some embodiments of the present disclosure may be suggested as one effective method giving a new characteristic to these buildings.

Some embodiments of the present disclosure will be implemented effectively by combining with smart devices. Even a person who does not receive a design education, it is possible to implement and share new creation including a special meaning of only oneself in the space by using some embodiments of the present disclosure, and freely select an object to be shared.

According to smart devices, people may have an experience related to a visual response that is combined with an electronic information and it will gradually become a part of their daily life, therefore, an innovative change may be expected. Some embodiments of the present disclosure may be related to a character application in this time and summarized as a character representation and interpretation that science technology is combined.

That is, a character may be 2-dimensionally or 3-dimensionally represented by using a science technology, or a scope of representation may be extended by combining a representing means of the character with a natural phenomenon such as a light or an autumn color.

In some embodiments of the present disclosure, a symbolic character being generated based on a principle of a creation of the Korean alphabet nowadays 571 years later since the great king Sejong has invented the Korean alphabet as a new characters in 1443 may keep on evolving in a use of various character including English and numerals as well as the Korean alphabet, with celebrating an achievement of King Sejong by the descendants, and modern people may also use a living space and natural phenomenon of oneself as a subject of a character representation.

In the present disclosure, while the present invention has been described with regard to some embodiments, the present invention is not limited to the specific embodiments described above, and may be implemented in various modifications by those skilled in the art to which the present invention pertains without departing from the scope of the present invention recited in the appended claims, and such modifications should not be understood to depart from the technical spirit or prospect of the present invention.

Some embodiments of the present disclosure may not only facilitate 2-dimensional and 3-dimensional design development and product application using various kinds of arts and crafts that a character is symbolized, but also may have industrial applicability of the design industrial field to promote a development of the industrial products that a character is symbolized even in various fields such as a fashion, an architecture, an interior, and a city planning, etc.

The invention claimed is:

1. A symbol image editing apparatus, the apparatus comprising:
    a processor configured to convert a character into a symbol image corresponding to the character based on a geometry of the character and an empty space within an image frame surrounding the geometry of the character, wherein the empty space is an area within the image frame not occupied by the geometry of the character; and
    an output configured to provide the converted symbol image,
    wherein the symbol image is generated on a position corresponding to that of the empty space in an image of the character, and
    wherein the symbol image includes at least one of (i) an object whose shape is substantially the same as a shape of the empty space and (ii) at least one character whose meaning represents the shape of the object.

2. The symbol image editing apparatus of claim 1, further comprising: an input configured to input an editing command to an editing unit so that the editing unit may change at least one of a size, a position, a color, and a shape of the symbol image.

3. The symbol image editing apparatus of claim 1, wherein a shape of the symbol image is determined by a shape of the empty space.

4. The symbol image editing apparatus of claim 3, wherein the shape of the symbol image is a triangle, a rectangle, a circle, or an angular figure.

5. The symbol image editing apparatus of claim 1, wherein the symbol image is created by overlapping at least two symbol images, and the symbol image comprises an identifier indicating at least one of a size, a position, a color, a shape, a light and shade, a brightness, a pattern, and a texture to distinguish each of the overlapped symbol images, and wherein the identifier represents a readout order of each of the symbol images.

6. A symbol image editing apparatus, the apparatus comprising:
a processor configured to convert a symbol image into a character based on a geometry of the character and an empty space within an image frame surrounding the geometry of the character, wherein the empty space is an area within the image frame not occupied by the geometry of the character; and
an output configured to provide the converted character, wherein the symbol image is generated on a position corresponding to that of the empty space in an image of the character, and
wherein the symbol image includes at least one of (i) an object whose shape is substantially the same as a shape of the empty space and (ii) at least one character whose meaning represents the shape of the object.

7. The symbol image editing apparatus of claim 6, further comprising: an input configured to input an editing command to an editing unit so that the editing unit may change at least one of a size, a position, a color, and a shape of the symbol image.

8. The symbol image editing apparatus of claim 6, wherein a shape of the symbol image is determined by a shape of the empty space.

9. The symbol image editing apparatus of claim 8, wherein the shape of the symbol image is a triangle, a rectangle, a circle, or an angular figure.

10. The symbol image editing apparatus of claim 6, wherein the symbol image is created by overlapping at least two symbol images, and the symbol image comprises an identifier indicating at least one of a size, a position, a color, a shape, a light and shade, a brightness, a pattern, and a texture to distinguish each of the overlapped symbol images, and wherein the identifier represents a readout order of each of the symbol images.

11. A symbol image editing apparatus, the apparatus comprising:
an input configured to receive information on one character; and
a processor configured to convert the information on the one character into information on an other character having the same meaning in a different language, wherein the information on the other character includes a geometry of the other character and an empty space within an image frame surrounding the geometry of the other character, and wherein the empty space is an area within the image frame not occupied by the geometry of the other character,
wherein the processor is further configured to generate a symbol image on a position corresponding to that of the empty space in a character image.

12. The symbol image editing apparatus of claim 11, wherein the input is configured to input an editing command to an editing unit so that the editing unit may change at least one of a size, a position, a color, and a shape of the symbol image generated by a generation unit within the processor.

13. The symbol image editing apparatus of claim 11, wherein a shape of the symbol image is determined by a shape of the empty space.

14. The symbol image editing apparatus of claim 11, wherein the shape of the symbol image is a triangle, a rectangle, or a circle.

15. The symbol image editing apparatus of claim 11, wherein the processor converts a character, inputted to the input, into first and second character information having the same meaning as the character in first and second languages different from the character, and
wherein the processor generates first and second symbol images at a position corresponding to a blank portion in first and second character images corresponding to the first and second character information, respectively.

16. The symbol image editing apparatus of claim 15, the processor overlaps the second symbol image on the first symbol image.

17. The symbol image editing apparatus of claim 16, wherein the first symbol image and the second symbol image are distinguished by at least one of a color, a position, a light and shadow, a brightness, a pattern, a texture, a size, and a shape.

18. A symbol image editing apparatus, the apparatus comprising:
an input configured to receive information on one character; and
a processor configured to convert the information on the one character into information on an other character having the same meaning in a different language, wherein the information on the other character includes a geometry of the other character and an empty space within an image frame surrounding the geometry of the other character, and wherein the empty space is an area within the image frame not occupied by the geometry of the other character,
wherein the processor is further configured to generat a symbol image corresponding to the other character information,
wherein the symbol image is a symbolic icon that is formed on a position corresponding to that of the empty space.

19. The symbol image editing apparatus of claim 18, wherein the input is configured to input an editing command to an editing unit so that the editing unit may change at least one of a size, a position, a color, and a shape of the symbol image generated by a generation unit within the processor.

20. A symbol image editing apparatus, the apparatus comprising:
an input configured to receive a symbol image which is an image of a symbolized character; and
a processor configured to convert the symbol image into a character corresponding to the symbol image based on a geometry of the character and an empty space within an image frame surrounding the geometry of the character, wherein the empty space is an area within the image frame not occupied by the geometry of the character,
wherein the processor is configured to convert the character into a character information having the same meaning in a different language,
wherein the symbol image is arranged on a position corresponding to the empty space.

21. A symbol image editing apparatus, the apparatus comprising:
a processor configured to convert a character into at least one position indicator based on a geometry of the character and an empty space within an image frame surrounding the geometry of the character, wherein the empty space is an area within the image frame not occupied by the geometry of the character; and an output configured to provide the at least one position indicator, wherein the at least one position indicator which represents information on a relative position of the empty space in the image frame.

22. A symbol image editing method, the method comprising:

converting a character into a corresponding symbol image based on a geometry of the character and an empty space within an image frame surrounding the geometry of the character, wherein the empty space is an area within the image frame not occupied by the geometry of the character; and outputting the converted symbol image, wherein the symbol image is generated on a position corresponding to that of the empty space in an image of the character, and wherein the symbol image includes at least one of (i) an object whose shape is substantially the same as a shape of the empty space and (ii) at least one character whose meaning represents the shape of the object.

23. A symbol image editing method, the method comprising:

converting a symbol image into a corresponding character based on a geometry of the character and an empty space within an image frame surrounding the geometry of the character, wherein the empty space is an area within the image frame not occupied by the geometry of the character; and outputting the character, wherein the symbol image generated on at a position corresponding to the empty space in an image of the character.

24. A symbol image editing method in a symbol image editing apparatus, the method comprising:

receiving, at the symbol image editing apparatus, information on one character;

converting, at the symbol image editing apparatus, the information on the one character into information on an other chacter having the same meaning in a different language, wherein the information on the other character includes a geometry of the other character and an empty space within an image frame surrounding the geometry of the other character, and wherein the empty space is an area within the image frame not occupied by the geometry of the other character; and generating, at the symbol image editing apparatus, a symbol image on a position corresponding to that of the empty space in a character image.

25. A symbol image editing method in a symbol image editing apparatus, the method comprising:

inputting a symbol image which is an image of a symbolized character;

converting the symbol image into a character corresponding to the symbol image based on a geometry of the character and an empty space within an image frame surrounding the geometry of the character, wherein the empty space is an area within the image frame not occupied by the geometry of the character; and converting the character into a character information having the same meaning in a different language, wherein the symbol image is arranged on a position corresponding to the empty space.

26. A non-transitory computer-readable medium containing computer executable instructions comprised in claim 22.

27. A non-transitory computer-readable medium containing computer executable instructions comprised in claim 23.

* * * * *